United States Patent [19]
House et al.

[11] Patent Number: 5,906,698
[45] Date of Patent: May 25, 1999

[54] SYSTEM FOR FABRICATING BELTS

[75] Inventors: Ronald D. House, Mustang; Lester B. Plumb; Ralph M. Palazzolo, both of Yukon; David R. Miller, Oklahoma City; Shermaine L. King, Oklahoma City; David A. Eck, Oklahoma City, all of Okla.

[73] Assignee: Xerox Corporation, Stamford, Conn.

[21] Appl. No.: 08/882,411

[22] Filed: Jun. 25, 1997

[51] Int. Cl.$^6$ .............................. B29C 53/42; B29C 65/74
[52] U.S. Cl. .......................... 156/137; 156/159; 156/218; 156/502; 156/510
[58] Field of Search .................................. 156/73.4, 157, 156/159, 137, 218, 285, 304.1, 304.3, 304.5, 304.6, 502, 510, 580.1, 580.2

[56] References Cited

U.S. PATENT DOCUMENTS

| | | | |
|---|---|---|---|
| 3,459,610 | 8/1969 | Dijkers et al. | 156/73.1 |
| 3,879,256 | 4/1975 | Rust, Jr. | 156/580.1 |
| 3,939,033 | 2/1976 | Grgach et al. | 156/515 |
| 3,947,307 | 3/1976 | Buchscheidt | 156/73.1 |
| 4,532,166 | 7/1985 | Thomsen et al. | 428/57 |
| 4,838,964 | 6/1989 | Thomsen et al. | 156/73.1 |
| 4,878,985 | 11/1989 | Thomsen et al. | 156/459 |
| 4,959,109 | 9/1990 | Swain et al. | 156/73.4 |

Primary Examiner—James Sells

[57] ABSTRACT

A process is disclosed for fabricating a flexible belt comprising conveying the leading edge of a flexible web from a supply roll to a slitting station, slitting the web a predetermined distance from the leading edge to form a web segment having the leading edge at one end and a trailing edge at the opposite end, conveying the leading edge toward the trailing edge, flowing at least one stream of fluid upwardly against the web segment to form an upwardly extending bulge in the segment adjacent the leading edge, flowing at least one stream of fluid downwardly against the web segment to form the web segment into a U-shape, overlapping the leading edge and the trailing edge of the web segment to form a joint, and welding the joint to permanently join the leading edge and the trailing edge together to form a belt. Apparatus for carrying out this process is also disclosed.

15 Claims, 14 Drawing Sheets

SYSTEM FOR FABRICATING BELTS

BACKGROUND OF THE INVENTION

This invention relates in general to apparatus and processes for fabricating flexible belts and more specifically to apparatus and processes for fabricating flexible electrophotographic imaging belts.

Various techniques have been devised to form belts from webs. Thermoplastic webs may be joined by overlapping the edge of one web over another and placing the overlapped or seam portion of the webs over a base beneath an ultrasonic vibrating welding element. The technique of ultrasonic welding of thermoplastic material is well known and illustrated, for example, in U.S. Pat. No. 4,532,166, U.S. Pat. No. 3,879,256, U.S. Pat. No. 3,939,033, U.S. Pat. No. 3,947,307 and U.S. Pat. No. 3,459,610, all of these patents being incorporated herein by reference in their entirety.

Unfortunately, batch processes for cutting and welding webs into belts require considerable time, duplicate manual handling, occupy excessive floor space and also require extensive equipment for alignment, cutting, welding trimming and other processing steps. Also, excessive manual handling increases the likelihood of damage to sensitive substrates or coatings, particularly for coated substrates that must meet precise tolerance requirements such as flexible electrostatographic imaging members including photoreceptors for high speed electrostatographic copiers, duplicators, printers and the like. Scratches and even fingerprints on the vulnerable surfaces of a sensitive, flexible photoreceptor renders the photoreceptor unacceptable for most electrostatographic copiers, duplicators and printers.

Also, when multiply batch handling techniques are utilized to fabricate belts, it is also often difficult to achieve uniform belt conicity and uniform quality. Moreover, because of differences in belt size requirements for different electrostatographic copiers, duplicators, printers and the like, a machine suitable for fabricating a belt of one diameter or width cannot be readily used to prepare a belt of a different diameter or width without encountering delays and expense. Further, lap joints formed with the leading edge over the trailing edge cannot be readily changed with the trailing edge over the leading edge for new batches where one side of a belt differs from the other side.

Automatic systems for fabricating belts have been created that overcome many of the problems encountered with manual or multiple batch belt making techniques. For example, automatic systems are described in U.S. Pat. No. 4,838,964 and U.S. Pat. No. 4,878,985. both of these patents being incorporated herein by reference in their entirety. A typical process involves providing a flexible web having a leading edge, horizontally conveying the leading edge of the flexible web from a supply roll to a predetermined distance past a slitting station, slitting the web at the slitting station to form a trailing edge of a web segment having the leading edge at one end and the trailing edge at the opposite end, gripping only the leading edge and trailing edge while supporting the web segment adjacent the leading edge with at least one upwardly directed fluid stream, conveying the leading edge over the trailing edge to allow gravity to form a downwardly hanging U-shaped loop in the web segment between the leading edge and trailing edge as the leading edge is conveyed toward the trailing edge, inverting the leading edge and the trailing edge of the web segment, overlapping the leading edge and the trailing edge of the web segment and permanently securing the leading edge to the trailing edge to form a belt.

Although many good belts may be fabricated with this system, it has been found that many belts produced by this system can contact underlying support surfaces such as a belt forming table during cutting of the web into segments, forming the segment into a loop, overlapping opposite ends of each segment, and welding the overlapped ends of each segment. Contact between the web and or belt and the belt forming table can damage the belt or web and increase friction that can inhibit acceptable formation of the loop thereby resulting in a defective belt. To prevent contact of the region of the belt between its ends, an attempt has been made to support the web over the belt forming table by means of a plurality of small air nozzles in the belt forming table. These nozzles supply a layer of air between the photoreceptor material and the belt forming table surface. The photoreceptor web floats on this layer of air. This reduces friction between the photoreceptor material and the belt forming table. When the web is floating properly, the force of gravity is adequate to pull the photoreceptor material down between two spaced apart gripping members utilized to form the belt loop. However, problems with the this belt forming technique are encountered in varying degrees, depending on the direction and amount of curl inherent in the photoreceptor web being used to form the belt. When the photoreceptor web possesses positive curl, the material presents a concave cross sectional shape to the surface of the belt forming table with the top of the dome of the concave shape facing upwardly, e.g.; having a shape similar to the cross section of an open umbrella. This concave shape captures the cushion of air between the material and the belt forming table and allows the material to easily float above the belt forming table. This is a desirable condition. With the material floating on a cushion of air, the force of gravity is usually sufficient to pull the web segment material down between the two gripping members as the leading edge is conveyed toward the trailing edge of the web segment. When the web has no curl, the material presents a flat shape to the surface of the belt forming table. This flat shape reduces the ability of the web to float because the volume of air produced by the small air nozzles in the belt forming table cannot maintain an adequate air cushion under the web. This causes the web to occasionally touch the surface of the belt forming table thereby increasing friction between the photoreceptor web and the belt forming table. When this condition occurs, the force of gravity may not be strong enough to overcome the force of friction acting on the web, and the web segment fails to fully drop down between the two gripping members as the leading edge is conveyed toward the trailing edge of the web segment. This failure of the web segment to fully drop and assume a "U" shape causes intermittent jamming of the web segment in the belt fabricating machine and loss of belt products. When the web possesses negative curl, the material presents a convex shape to the surface of the belt forming table with the bottom of the dome of the convex shape facing downwardly, e.g. having a shallow "U" shape. The convex shape does not allow a cushion of air to build up under the photoreceptor web and greatly reduces the ability of the web to float. This allows the web material to come into direct contact with the belt forming table thereby increasing friction between the table and the web. With this excess friction, the force of gravity is not sufficient to pull the web segment down between the two gripping members as the leading edge is conveyed toward the trailing edge of the web segment. Poor belt quality can adversely affect electrophotographic imaging performance, particularly in high performance monochrome and color copiers, duplicators and printers which demand precise tolerances throughout the belt. Poorly formed belts, scratches and other blemishes on belt surfaces can be readily detected with the naked eye and are of unacceptable quality. Scrapping of poor quality electrophotographic imaging belts can significantly affect manufacturing yields.

INFORMATION DISCLOSURE STATEMENT

U.S. Pat. No. 4,838,964 issued Jun. 13, 1989, a process for fabricating belts are disclosed in which the leading edge of a web is conveyed from a supply roll into a belt loop forming station, the web is gripped while under tension and cut a predetermined distance from the leading edge to form a web segment having the leading edge at one end and a trailing edge at the opposite end, the lower surface of the web adjacent the leading edge is inverted, the lower surface of the web adjacent the trailing edge is inverted, the inverted leading edge and the inverted trailing edge are overlapped to form a loop of the web segment loosely suspended from the joint formed by the overlapped leading edge and trailing edge, the loop of the web segment at the belt loop forming station is transferred to an anvil, the loop of the web segment on the anvil is conveyed to a welding station and the overlapped leading edge and trailing edge are welded together on the anvil to form a belt welded at the joint.

U.S. Pat. No. 4,878,985 issued Nov. 7, 1989, a process and apparatus for fabricating belts are disclosed in which the leading edge of a web is conveyed from a supply roll into a belt loop forming station, the web is gripped while under tension and cut a predetermined distance from the leading edge to form a web segment having the leading edge at one end and a trailing edge at the opposite end, the lower surface of the web adjacent the leading edge is inverted, the lower surface of the web adjacent the trailing edge is inverted, the inverted leading edge and the inverted trailing edge are overlapped to form a loop of the web segment loosely suspended from the joint formed by the overlapped leading edge and trailing edge, the loop of the web segment at the belt loop forming station is transferred to an anvil, the loop of the web segment on the anvil is conveyed to a welding station and the overlapped leading edge and trailing edge are welded together on the anvil to form a belt welded at the joint.

U.S. Pat. No. 4,959,109 issued Sep. 25, 1990, a process and apparatus are disclosed for fabricating belts are disclosed comprising conveying a first mandrel to a wrapping station, supplying the leading edge of a web from a web supply roll to the first mandrel at the wrapping station, retaining the leading edge of the web on the first mandrel by means of a partial vacuum, wrapping the web around the first mandrel by rotating the first mandrel for about one revolution, severing the web at the wrapping station to form a trailing edge which overlaps the leading edge of the web to form a first belt having a seam, substantially simultaneously conveying the first mandrel to a welding station and conveying a second mandrel to the wrapping station, and substantially simultaneously wrapping the second mandrel with fresh web material from the web supply roll and welding the seam on the first belt on the first mandrel to form a unitary belt. These welded belts may be automatically removed from the mandrels at a belt discharge station.

REFERENCE TO RELATED COPENDING APPLICATION

Copending patent application Ser. No. 08/327,532, filed by Christopher J. Rhodes on Oct. 21, 1994, entitled Process For Fabricating Belts—A process and apparatus for fabricating belts are disclosed. The process includes conveying the leading edge of a flexible web from a supply roll past a slitting station, slitting the web a predetermined distance from the leading edge to form a web segment having the leading edge at one end and a trailing edge at the opposite end, maintaining the web slack at the location where the web is slit during slitting, overlapping the leading edge and the trailing edge of the web segment to form a joint and welding the joint to permanently join the leading edge and the trailing edge together to form a belt. The apparatus includes means to convey the leading edge of a flexible web from a supply roll past a slitting station, means at the slitting station to slit the web a predetermined distance from the leading edge to form a web segment having the leading edge at one end and a trailing edge at the opposite end, means to maintain the web slack at the location where the web is slit during slitting, means to overlap the leading edge and the trailing edge of the web segment to form a joint and means to weld the joint to permanently join the leading edge and the trailing edge together to form a belt.

The characteristics of prior belt fabrication systems exhibit deficiencies for manufacturing belts having precise belt tolerance requirements.

SUMMARY OF THE INVENTION

It is an object of the invention to overcome the above-noted deficiencies by providing an improved process and apparatus for fabricating belts.

It is another object of this invention to provide a process and apparatus that enables more efficient fabrication of photoreceptor belts.

It yet another object of this invention to provide a process and apparatus or fabricating photoreceptor belts without scratching or abrading the belt.

It still another object of this invention to provide a process and apparatus for more reliably fabricating high quality photoreceptor belts.

It is another object of this invention to provide a process and apparatus that enables fabrication of photoreceptor belts with fewer rejects.

The foregoing objects and others are accomplished according to this invention by a process comprising conveying the leading edge of a flexible web from a supply roll to a slitting station, slitting the web a predetermined distance from the leading edge to form a web segment having the leading edge at one end and a trailing edge at the opposite end, conveying the leading edge toward the trailing edge, flowing at least one stream of fluid upwardly against the web segment to form an upwardly extending bulge in the segment adjacent the leading edge, flowing at least one stream of fluid downwardly against the web segment to form the web segment into a U-shape, overlapping the leading edge and the trailing edge of the web segment to form a joint, and welding the joint to permanently join the leading edge and the trailing edge together to form a belt. The apparatus for fabricating the flexible belt comprises a conveying gripper to convey the leading edge of a flexible web under tension from a supply roll downstream past a slitting station, a cutting device at the slitting station to slit the web a predetermined distance from the leading edge to form a web segment having the leading edge at one end and a trailing edge at the opposite end, a first invertible gripper to support the trailing edge, a second invertible gripper adapted to receive the leading edge from the conveying gripper, a first fluid stream implement to direct at least one fluid stream upwardly against the web segment to support the web segment between the leading edge and the second invertible gripper, a second fluid stream implement to direct at least one fluid stream downwardly against the web segment to form a U-shaped loop in the web segment between the second invertible gripper and the first invertible gripper, at least one drive mechanism to invert the first invertible gripper and second invertible gripper to overlap the leading edge and the trailing edge of the web segment to form a joint, and a joining device to permanently join the leading edge and the trailing edge together to form a belt.

The flexible belts may be rapidly prepared with a precise uniform shape. The flexible belts prepared by the apparatus and processes of this invention are particularly useful for applications such as electrostatographic photoreceptors utilizing sensitive organic layers supplied in the form of long webs, especially long webs having an electrically conductive ground strip on one edge. In addition, precise control of the dimensions of the photoreceptors allows rapid changes in size for different production runs to fabricate belts of different diameters or different widths.

BRIEF DESCRIPTION OF THE DRAWINGS

A more complete understanding of the process and apparatus of the present invention can be obtained by reference to the accompanying drawings wherein.

DESCRIPTION OF THE PREFERRED EMBODIMENTS

Figure 1:
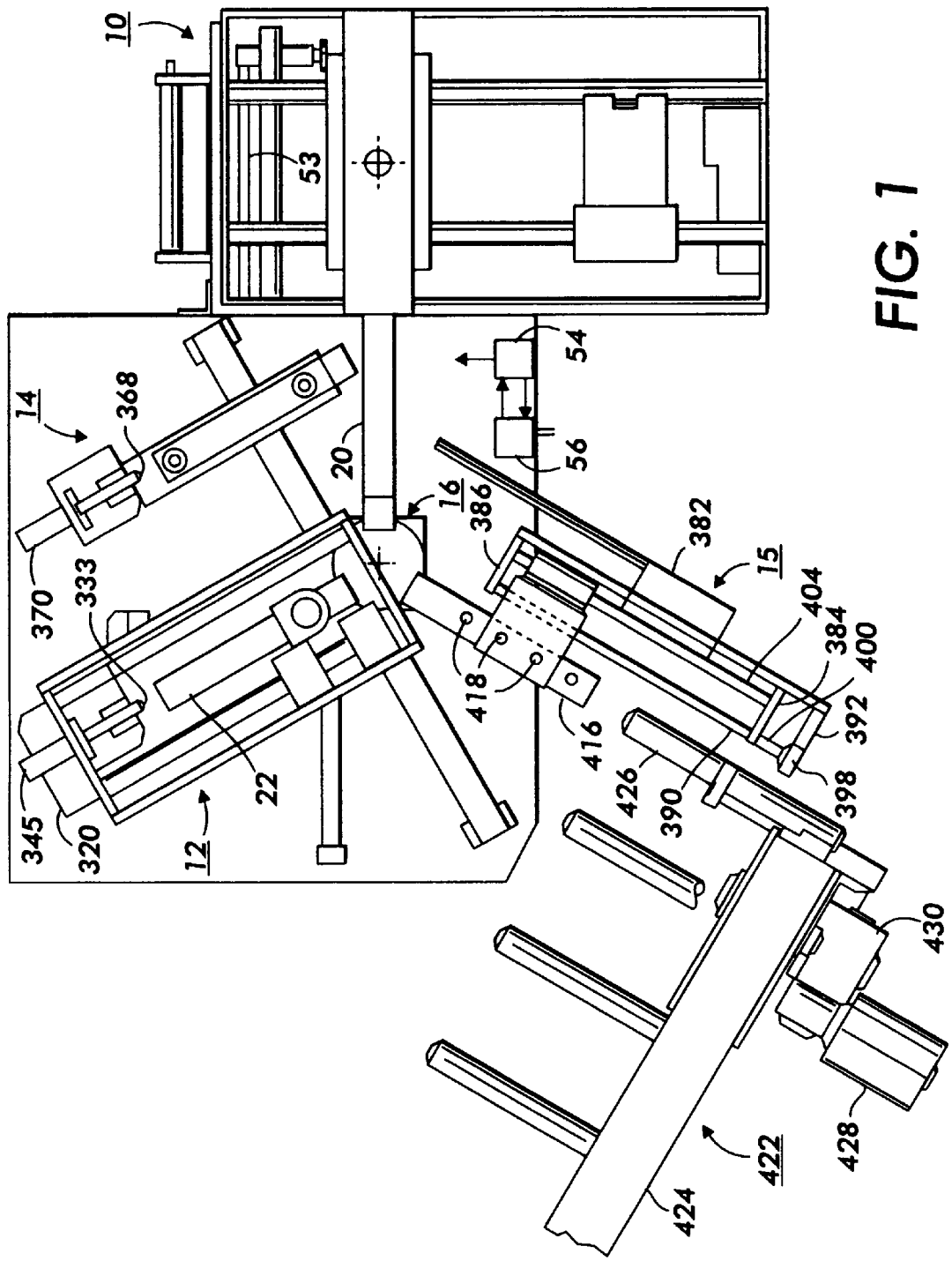
FIG. 1 is a schematic, plan view showing apparatus with four processing stations for fabricating belts from a web.

Referring to FIG. 1, processing stations for fabricating belts from a web are disclosed. These processing stations comprise belt loop forming station 10, belt welding station 12, belt notching station 14, and belt discharge station 15. These stations are serviced by rotation and reciprocateable belt conveying system 16 comprising belt conveying anvils 18,20 and 22.

Figure 2:
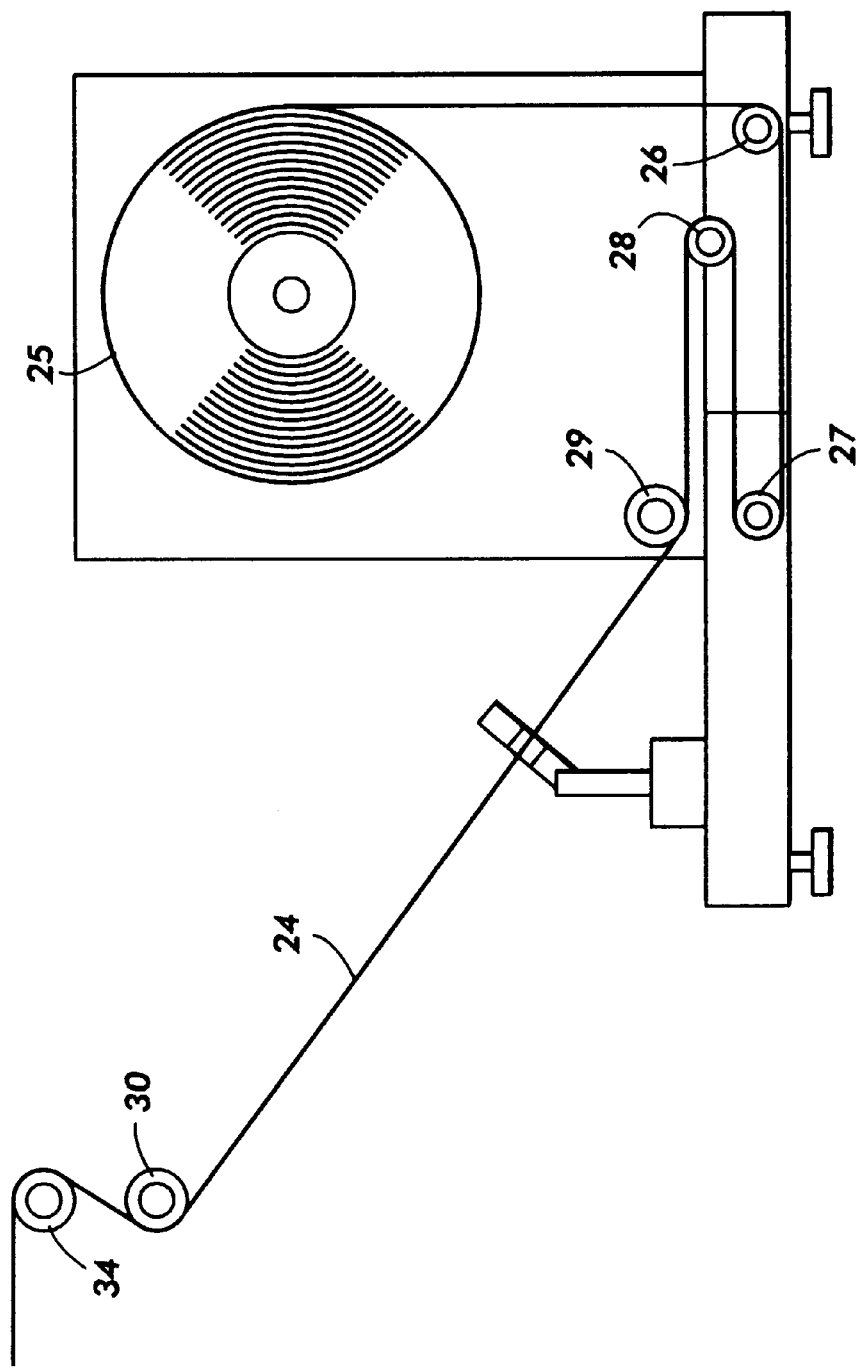
FIG. 2 is a schematic, sectional view in elevation of web supply and feed apparatus.
Figure 3:
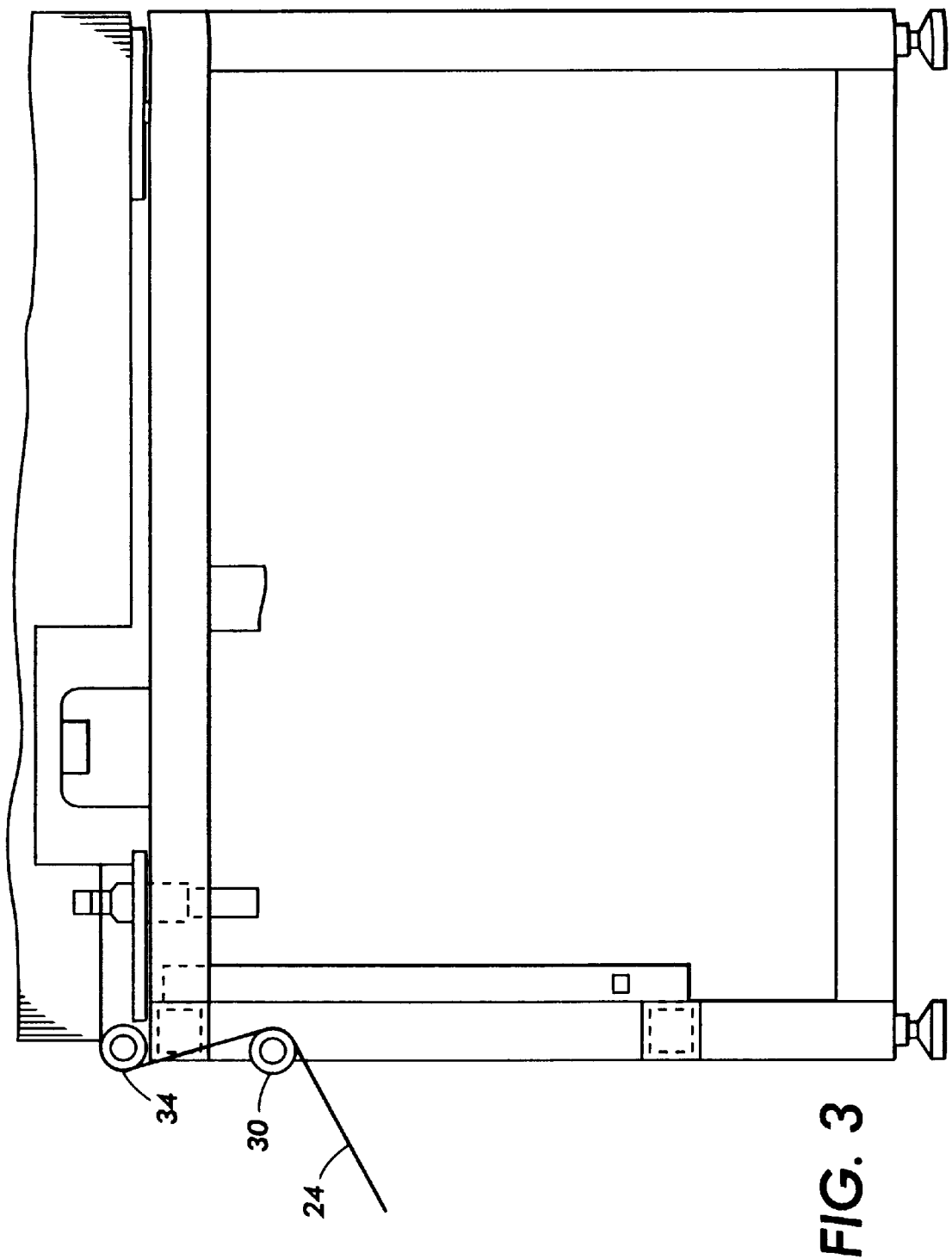
FIG. 3 is a schematic, sectional view in elevation of the web being fed into a web loop forming station.

As shown in FIGS. 1, 2 and 3, web 24, such as a thin coated or uncoated thermoplastic web, is supplied by a supply roll 25 and fed around air bearing 26, air bearing 27, dancer roll 28, air bearing 29, air bearing 30 and air bearing 34. Air bearings 26, 30 and 34 and dancer roll 28 each contain a hollow annular chamber (not shown) and a porous outer shell of metal particles. Air bearings are particularly desirable where the web is a photoreceptor having an abrasion sensitive surface generally facing downwardly during processing after the web is removed from the roll. Any suitable conventional dancer roll means may be employed for dancer roll 28. For example, dancer roll 28 may be supported by an idler arm biased with a pneumatic cylinder (not shown) which swings roll 28 to the right in a shallow substantially horizontal arc to maintain tension in web 24. A typical dancer roll is described in U.S. Pat. No. 4,878,985, the disclosure thereof being incorporated herein by reference. If desired, supply roll 25 may be fitted with a suitable adjustable brake or drag (not shown) to regulate the amount of tension employed to pull web 24 from supply roll 25. Typical web tensions are between about 0.1 lb/in and about 5 lb/in.

The belt loop forming station 10 is shown in greater detail in FIGS. 2, 3, 4 and 5. The web 24 supplied by supply roll 25 is passed around stationary air bearings 26, 27, 29 30 and 34 . All the air bearings and the dancer roll comprise hollow annular chambers (not shown) within a porous outer shell such as a shell of sintered metal particles. Air under pressure from a suitable source is fed through conventional hoses (not shown) to the hollow annular chambers of dancer roll 28 and air bearings 26, 27, 29 30 and 34 and allowed to escape through the porous shell to provide an air bearing which prevents damaging contact with the surface of web 24 and reduces friction that must be overcome to pull the web 24 from the supply roll 25. Moreover, the serpentine shape of the paths of web 24 around the air bearings impart sufficient lateral strength to web 24 to allow edge guides 44 and 46 to laterally position web 24 without buckling as it travels through belt loop forming station 10. If desired, the serpentine shaped path may be extended to provide a longer serpentine path for web 24. The dancer roll 28 and air bearings 26, 27, 29 30 and 34 are commercially available in the form of a porous metal tube, e.g. from Mott Metallurgical Corporation, Farminton Conn.

Figure 4:
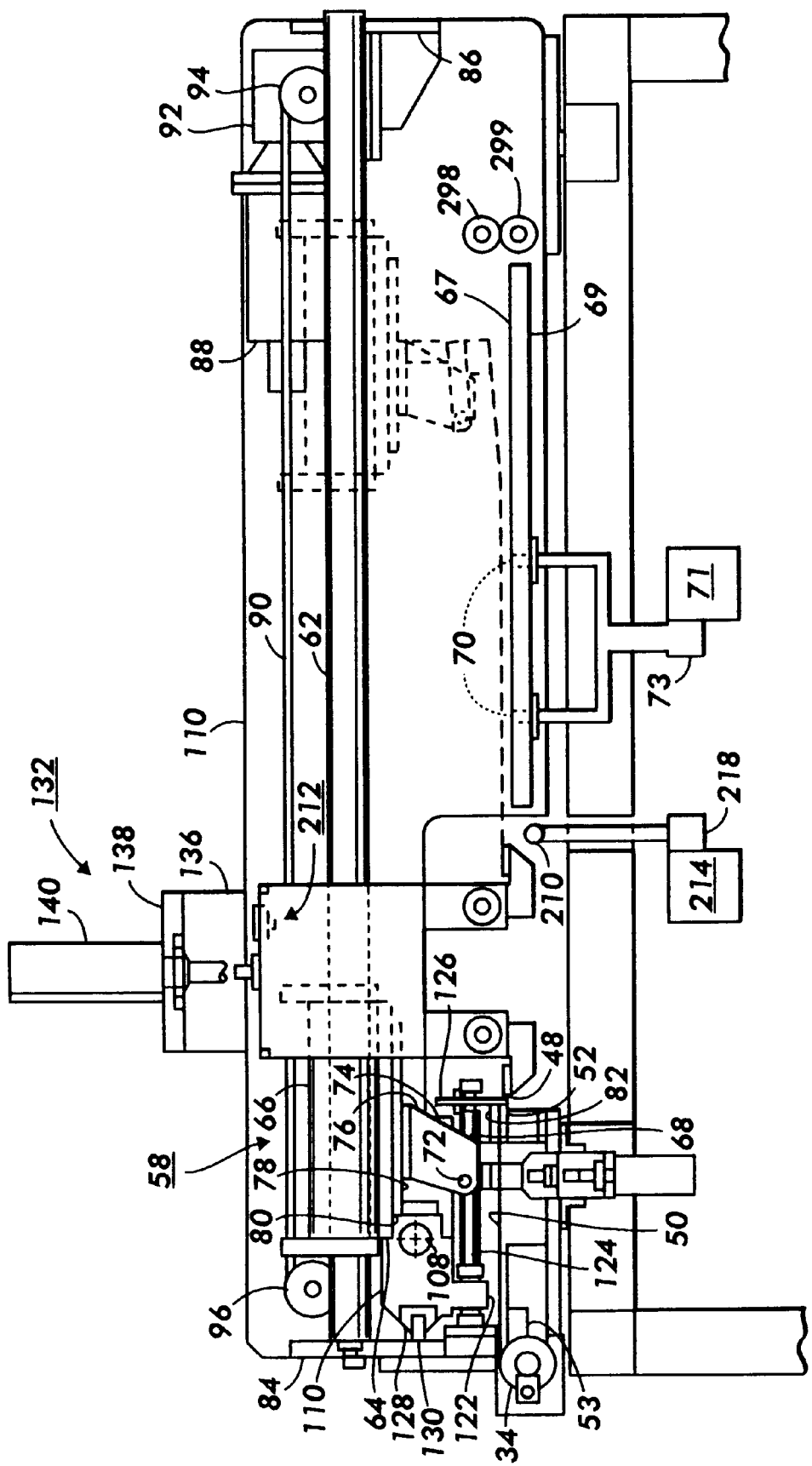
FIG. 4 is a schematic, sectional view in elevation of a web loop forming station.
Figure 5:
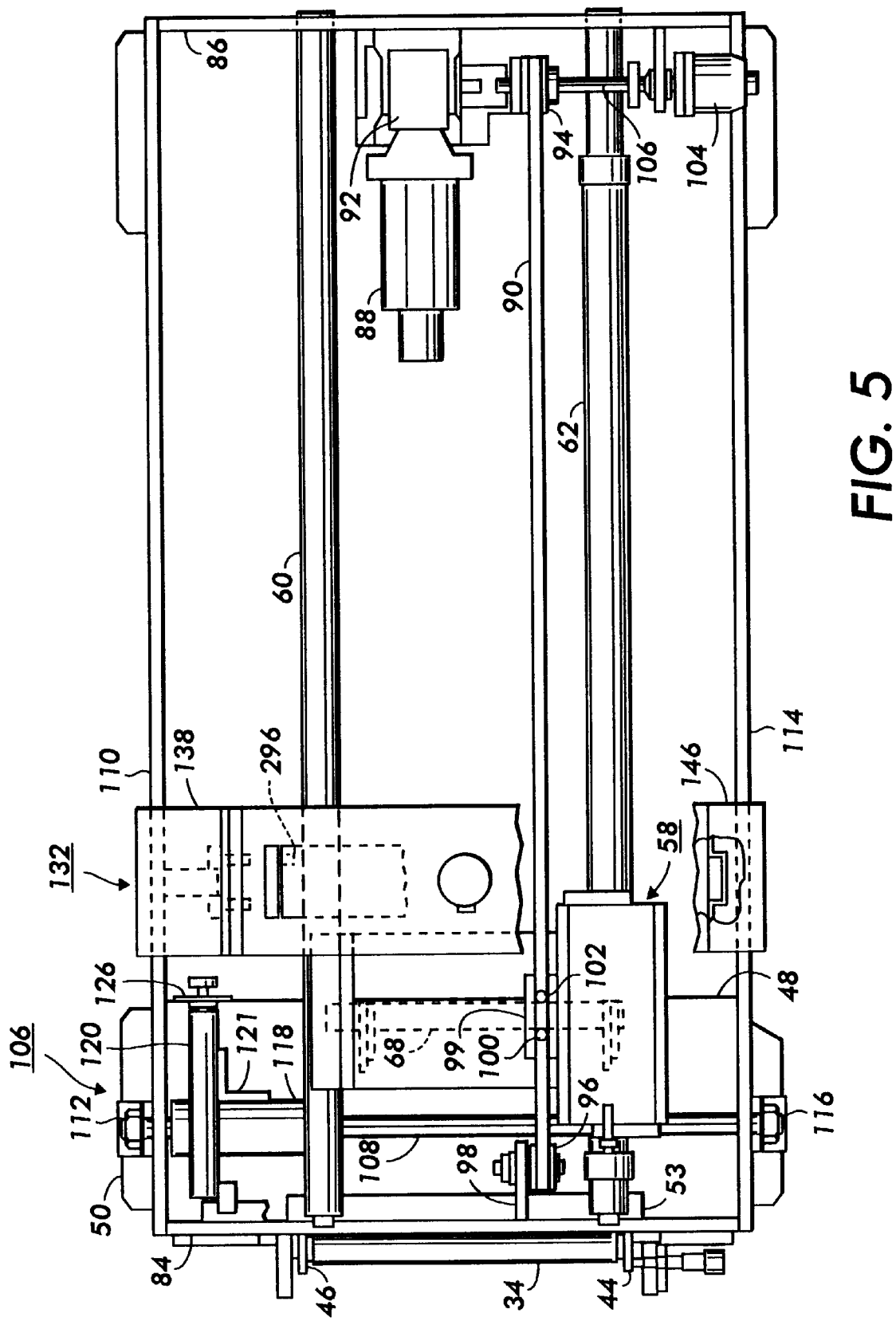
FIG. 5 is a schematic, sectional plan view of a web loop forming station.

With reference to FIGS. 4 and 5, the leading edge of web 24 is initially fed to the cutting edge 48 of web receiving platform 50 and held against web receiving platform 50 by a partial vacuum provided by vacuum shoe 52 which is connected through an underlying vacuum plenum (not shown) to a suitable vacuum source (not shown). A second vacuum shoe 53 is positioned upstream of vacuum shoe 52 to hold web 24 against web receiving platform 50. Any suitable vacuum shoe design may be utilized to enable shoes 52 and 53 to grip web 24. Typical vacuum shoes comprise one or more rows of holes of any suitable shape over a vacuum plenum, one or more rows of shallow grooves of any suitable shape connected by passages to an underlying vacuum plenum, a porous member of sintered particles over a vacuum plenum, and the like. The creation and removal of a vacuum in vacuum shoes 52 and 53 may be accomplished by activating a suitable solenoid operated valve in valve and switch cluster 54 (see FIG. 1). Valve and switch cluster 54 also includes other suitable valve and electrical switch actuators for the various pneumatic cylinders, motors and the like in the station subassemblies. The valves in valve and switch cluster 54 are conventional solenoid operated valves which are commercially available, for example from Mac Valves, Inc., Wixom, Mich. Positive pressure, a vacuum or ambient air pressure may be supplied from any suitable conventional source by suitable means such as ordinary air coupling lines (not shown). The expression "vacuum" as employed herein is intended to mean a partial vacuum rather than a complete vacuum. Similarly, electrical power to drive electrical equipment such as motors, solenoids, servomotors and the like are supplied through suitable wiring and conventional suitable electrical switching. The valve and switches are usually actuated through suitable circuitry in response to a signal from a programmable controller 56 (see FIG. 1). Expressions such as "activation", "supplying power", "inactivation" and the like are well known terms intended to include opening or closing solenoid operated valves or electrical switches to provide or discontinue providing positive pressure, a vacuum, ambient air pressure, electricity an the like. Thus, the control functions in the apparatus of this invention are synchronized and integrated with a suitable programmable controller 56 such as a Allen Bradley Programmable Controller, Model No. 2/05 or Model No. 2/17. The programmable controller responds to various typical inputs including, for example, inputs from limit switches, timers, encoders, proximity sensors, counters and the like and utilizes these inputs for sequencing program outputs to activate electric switches, solenoid operated valves that either vent a vacuum shoe, such as vacuum shoes 52 or 53, to the ambient atmosphere or connect either or both vacuum shoes to an evacuated chamber (not shown), and the like. Termination of an activated component may be effected by any suitable and conventional means such as by programmable controller 56 or by suitable limit switches.

As further illustrated in FIGS. 4 and 5, reciprocating web pick up assembly 58 is mounted above web receiving platform 50 and web 24 and is supported on a pair of guide rods 60 and 62. Web pick up assembly 58 comprises a platform 64, one side of which is slideably supported on guide rod 60 by cam follower rollers (not shown) and the other side being slideably supported on guide rod 62 by bearing block 66. Guide rod 62 extends over and is parallel to the upper surface 67 of belt forming table 69. Belt forming table 69 contains a plurality of fluid passages 70 which are connected by ordinary fluid coupling lines to any suitable source of compressed fluid 71. The fluid passages 70 may comprise rows of holes, slots or any other suitable passages for directing a fluid stream such as air in an upward direction. The holes or slots may be of any suitable shape such as round, oval, square, rectangular, convergent, divergent, and the like. The size of the holes selected depends on various factors such as the fluid pressure employed, the number of holes used, the spacing of the holes, the weight of the web, the speed of the web, porosity of the web, thickness of the web, and the like. However, the size, number and spacing is preferably sufficient to suspend the web on a cushion of flowing fluid. If more than one hole is utilized, the holes may be arranged in any suitable pattern including, for example, one or more straight line rows, staggered patterns, circular pattern, and the like. The creation and removal of a compressed fluid may be accomplished by activating a suitable solenoid operated valve in valve and switch cluster 73 (see FIG. 4). The valves in valve and switch cluster 73 are conventional solenoid operated valves which are commercially available. Any other suitable valves and switches may be utilized, if desired. Positive fluid pressure may be supplied from any suitable conventional source 71 by suitable means such as ordinary fluid coupling lines. The valve and switches are usually actuated through suitable circuitry in response to a signal from a programmable controller. As described above, the control functions in the apparatus of this invention may be synchronized and integrated with any suitable programmable controller 56, such as an Allen Bradley Programmable Controller, Model No. 2/05 or Model No. 2/17. The programmable controller responds to various typical inputs including, for example, inputs from limit switches, timers, encoders, proximity sensors, counters and the like and utilizes these inputs for sequencing program outputs to activate or inactivate electric switches, solenoid operated valves that either vent a fluid nozzle or passageway, such fluid passages 70, to the ambient atmosphere or connect a fluid nozzle or passageway to a pressurized fluid source 71. Activation of solenoid 74 is also effected by programmable controller 56 which supplies electrical power through conventional wiring (not shown). Shaft 72 is supported by a pair of end plates 76 which are fastened to plates 78 and 80. Plate 80 is supported by platform 64. A vacuum shoe 82 is mounted on the bottom of the free swinging end of pivotable plate 68. Pivotable plate 68 and vacuum shoe 82 extend transversely across substantially the entire width of web 24. The length of vacuum shoe 82 is normally slightly shorter than the width of web 24. Any suitable vacuum shoe, such as a shoe similar to the previously described vacuum shoe 52, may be utilized for shoe 82 to grip web 24. The creation and removal of a vacuum in a vacuum plenum (not shown) overlying vacuum shoe 52 is accomplished by programmable controller 56 which controls suitable conventional solenoid activated valves which either connect vacuum plenum to an evacuated chamber or vent the vacuum plenum to the ambient atmosphere. The guide rods 60 and 62 are supported by end plates 84 and 86. Reciprocation of web pick up assembly 58 between a home position (shown on the left in FIGS. 4 and 5), an advanced intermediate shear position (illustrated with phantom lines in FIG. 4) and other locations on guide rods 60 and 62 is effected with the air of servomotor 88 which drives timing and drive belt 90 through gear box 92 and drive pulley 94. The home position of web pick up assembly 58 aligns vacuum shoe 82 directly over vacuum shoe 52 so that vacuum shoe may accept transfer of the leading edge of belt 24 after belt 24 is severed. Drive belt 90 is supported at one end by drive pulley 94 and at the other end by idler pulley 96. Idler pulley 96 is supported by flange 98 which is welded to end plate 84. A flange 99 mounted to bearing block 66 is fastened to timing and drive belt 90 by rivets 100 and 102. Thus, reciprocal movement of timing and drive belt 90 causes web pick up assembly 58 to reciprocate accordingly on guide rods 60 and 62. In addition to driving pulley 94, servomotor 88 also drives encoder 104 by means of shaft 106. Encoder 104 is electrically connected to programmable controller 56 by suitable wiring (not shown) to supply electrical signals to the programmable controller 56 indicating the relative location of web pick up assembly 58. Any suitable encoder may be employed. A typical encoder is an Allen Bradley Encoder, Model No. 845N-SJD-NY-CRYI available from Allen Bradley. The movement of web pick up assembly 58 is accomplished by programmable controller 56 which controls the starting, stopping and reversal servomotor 88. Generally, the spacing or distance of vacuum shoe 82 from cutting edge 48 is determined by merely inputting suitable instructions into programmable controller 56 to achieve the degree of belt overlap desired in the final belt loop seam. However, although less desirable, other suitable means may be used instead of or in combination with spacing of vacuum shoe 82 from cutting edge 48 to achieve the desired amount of belt overlap in the belt loop seam.

Also shown in FIGS. 4 and 5 is a web slitting station comprising a web cutter assembly 106 comprising hollow nonmagnetic shaft 108 secured at one end to side plate 110 by nut 112 and at the other end to side plate 114 by nut 116. Contained within hollow nonmagnetic shaft 108 is a slidable magnet piston (not shown) which is driven back and forth along the length of hollow nonmagnetic shaft 108 by compressed air alternately introduced at each end of hollow nonmagnetic shaft 108 through suitable fittings (not shown). Slideably mounted on hollow nonmagnetic shaft 108 is a magnetic bearing block 118. As the slidable magnet piston is driven back and forth in hollow nonmagnetic shaft 108 by compressed gas, the attractive magnetic force from the magnet piston attracts the magnetic bearing block 118 and causes magnetic bearing block 118 to slide back and forth on hollow nonmagnetic shaft 108 in unison with the magnet piston. A magnetic reciprocating drive system of the type illustrated is available, for example, from Festo Corporation, Hauppauge, N. Y. Any other suitable reciprocating drive means may be substituted for the magnetic device. Typical reciprocating drive means include ball and lead screw, pneumatic piston, servomotor, and the like. Support plate 120 angle iron 121 and magnetic bearing block 118 are welded together to form a rigid unitary assembly. The bottom of support plate 120 carries a pair of bearing blocks, one designated by the reference number 122 and the other not shown. These bearing blocks support a freely rotateable shaft 124 which carries a disc shaped cutting blade 126. Support plate 120 also carries a bifurcated bearing block 128 which rides on guide rail 130. Guide rail 130 is welded to end plate 84. Bifurcated bearing block 128 aids in the stabilization and alignment of disc shaped cutting blade 126 as it is reciprocated back and forth along cutting edge 48 of web receiving platform 50 to sever web 24. If desired, other suitable cutting means may be substituted for the disk blade. Typical cutting or slitting devices include laser cutters, straight edge knives, guillotine shear, and the like. Actuation and reciprocation of disc shaped cutting blade 126 along cutting edge 48 is accomplished by programmable controller 56 to control suitable conventional valves (not shown) connected to a source of compressed gas that is supplied to hollow nonmagnetic shaft 108. In order to avoid collision between cutting blade 126 and web pick up assembly 58 when web pick up assembly 58 is traveling to its home position, cutting blade 126 is moved to its own home position (shown in FIG. 5) when it is not severing web 24.

Figure 6:
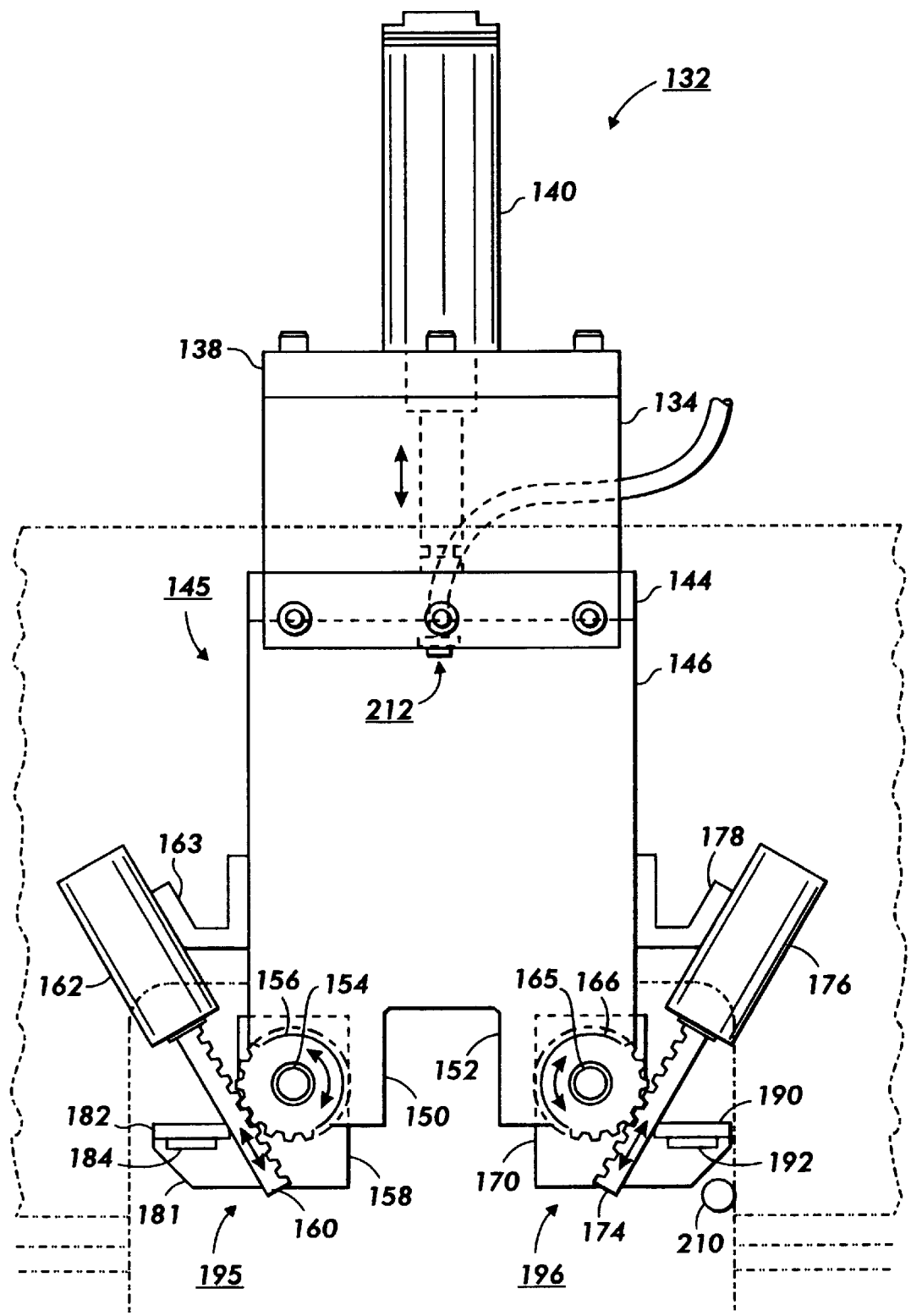
FIG. 6 is an expanded schematic, section end view of a belt loop shaping assembly.
Figure 7:
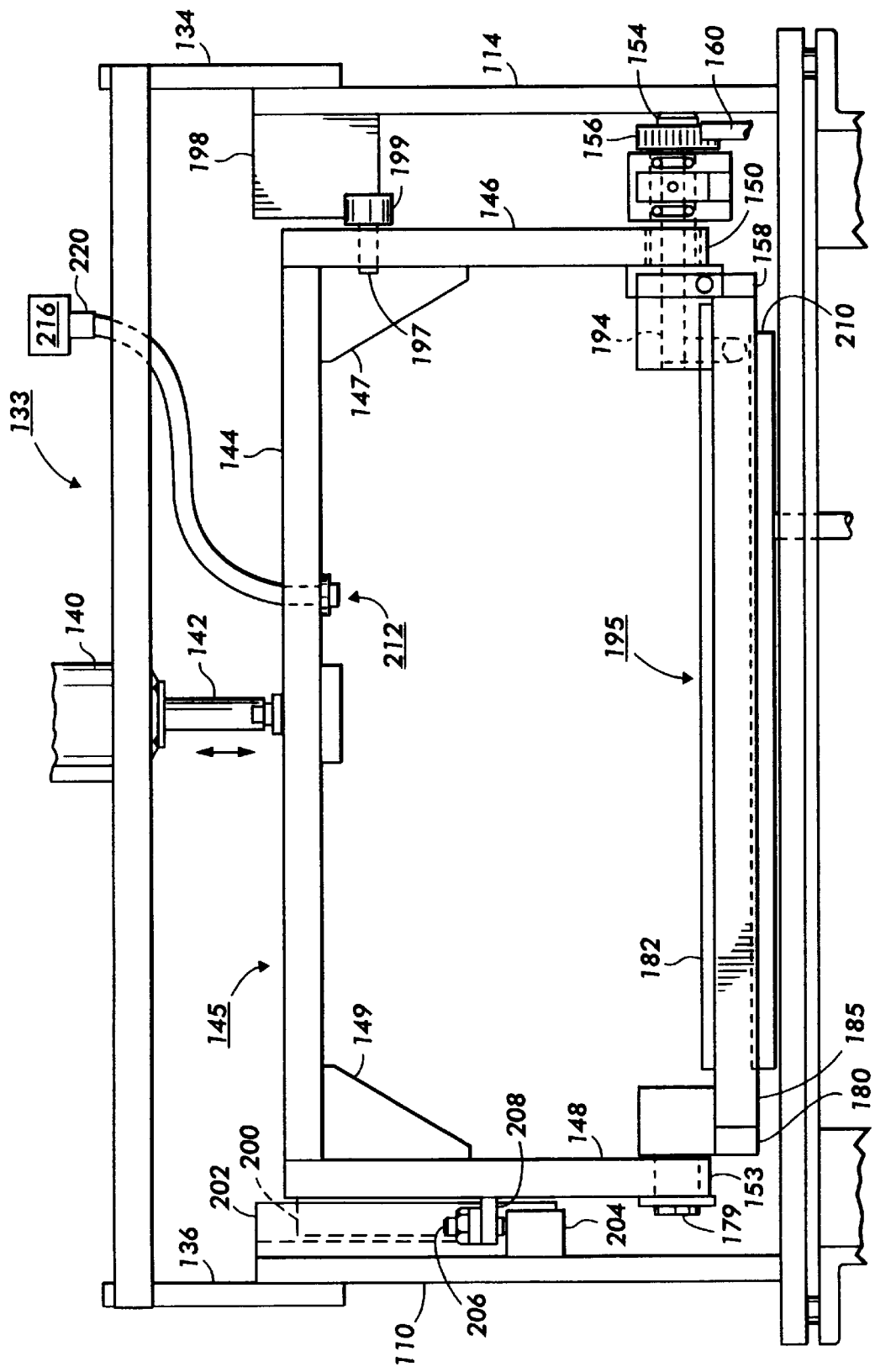
FIG. 7 is an expanded schematic, sectional side view of a belt loop shaping assembly.

Referring to FIGS. 4, 5, 6 and 7, a belt loop shaping assembly 132 is shown comprising stationary vertical plates 134 and 136 bolted to side plate 114 and side plate 110, respectively. The ends of horizontal stationary plate 138 are bolted to stationary vertical plates 134 and 136. Mounted on the top of horizontal stationary plate 138 is a pneumatic cylinder 140. Pneumatic cylinder 140 is a conventional two-way acting cylinder in which piston movement is determined by which side of the piston is pressurized. In other works, the piston is made to move in one direction by pressurized air introduced onto a first chamber on a first side of the piston and made to move in the opposite direction by diverting the pressurized air into a second chamber on the other side of the piston while venting the first chamber. Actuation of pneumatic cylinder 140 is accomplished by programmable controller 56 to control conventional valves to connect pneumatic cylinder 140 by suitable air hoses (not shown) to a source of pressurized as or to the atmosphere. Reciprocateable piston rod 142 extends downwardly from pneumatic cylinder 140. The lower end of reciprocateable piston rod 142 is fastened to horizontal plate 144 of reciprocateable looping assembly 145. One end of horizontal plate 144 is bolted to the top vertical plate 146 with the aid of angle bracket 147 and the other end is bolted to the top vertical plate 148 with the aid of angle bracket 149. The bottoms of vertical plate 146 and vertical plate 148 are bifurcated to form two legs. Legs 150 and 152 at the bottom of vertical plate 146 are illustrated in FIG. 6. Leg 150 located at the bottom of vertical plate 146 and leg 153 at the bottom of vertical plate 148 are shown in FIG. 7. Leg 150 on vertical plate 146 supports a rotateable horizontal shaft 154 which extends outwardly from each side of leg 150. A rack and pinion arrangement is employed to rotate rotateable horizontal shaft 154 with pinion 156 mounted on rotateable horizontal shaft 154 on the side of leg 150 which faces away from vertical plate 148. The other end of rotateable horizontal shaft 154 is rigidly secured to and supports a pivotable "L" shaped side plate 158. Pinion 156 is driven by reciprocateable rack 160. Rack 160 is reciprocated by pneumatic cylinder 162 which is rigidly secured to vertical plate 146 by flange 163. Pneumatic cylinder 162 is a conventional two-way acting cylinder in which piston movement is determined by which side of the piston is pressurized. Mounted on leg 152 is a mirror image arrangement of the assembly mounted on leg 150, namely a rotateable horizontal shaft 165 which extends outwardly from each side of leg 152; a pinion 166 mounted on rotateable horizontal shaft 165; pivotable "L" shaped side plate 170, reciprocateable rack 174; pneumatic cylinder 176; and flange 178. Actuation of pneumatic cylinders 162 and 176 is accomplished by programmable controller 56 to control conventional valves to independently connect pneumatic cylinders 162 and 176 by suitable air hoses (not shown) to a source to pressurized gas or to the atmosphere. On the side of each leg of the bifurcated bottom of vertical plate 148 facing vertical plate 146, a rotateable shaft 179 (shown in FIG. 7) on leg 153 of vertical plate 148 and an identical rotateable shaft (not shown) on the other companion leg (not shown) of vertical plate 148 are mounted at locations directly opposite from respective rotateable shafts 154 and 165 on vertical plate 146. A pivotable "L" shaped side plate 180 having a shape that is a mirror image of pivotable "L" shaped side plate 158 is mounted on rotateable shaft 179 on the leg 153 of vertical plate 148 directly opposite from the location of respective rotateable shaft 154. Similarly, a pivotable "L" shaped side plate (not shown) having a mirror image shape of pivotable "L" shaped side plate 170 is mounted on the rotateable shaft (not shown) on the leg of vertical plate 148 directly opposite from the location of respective rotateable shaft 165. Arm 181 of pivotable "L" shaped side plate 158 and the corresponding arm (not shown) on the directly opposite mirror image pivotable "L" shaped side plate 180 cooperate with each other to carry a vacuum shoe 182 beneath which is located a vacuum plenum 184 (shown in FIG. 6) which extends along the length of vacuum shoe support plate 185 (shown in FIG. 7). Similarly, arm 186 of pivotable "L" shaped side plate 170 and the corresponding leg on the directly opposite mirror image pivotable "L" shaped side plate supported by vertical plate 148 cooperate with each other to carry a vacuum shoe 190 beneath which is located a vacuum plenum 192. The length of vacuum shoe 182 and vacuum shoe 190 is normally slightly shorter than the width of web 24. Any suitable vacuum shoe, such as a shoe similar to the previously described vacuum shoe 52, may be utilized for vacuum shoes 182 and 190. Vacuum plenums 184 and 192 are connected by passages such as passage 194 (shown in FIG. 7) to suitable fittings and hoses through control valves (not shown) to a vacuum source. Activation and inactivation of vacuum plenums 184 and 192 are independently accomplished by programmable controller 56 to control conventional valves to connect vacuum plenums 184 and 192 by suitable hoses (not shown) to a source of vacuum or to vent the vacuum plenums to the atmosphere. The combination of pivotable "L" shaped side plates 158 and 180 with vacuum shoe 182 and vacuum shoe support plate 185 comprise a first invertable gripper assembly 195. The combination of pivotable "L" shaped side plates 170 and its companion pivotable "L" shaped side plates (not shown) with vacuum shoe 190 and its underlying vacuum shoe support plate (not shown) comprise a second invertable gripper assembly 196.

As shown in FIG. 7, the vertical path of vertical plate 146 during reciprocation by pneumatic cylinder 140 is guided by a pair of cam followers 199 (only one is shown in FIG. 7) rotateably mounted on shafts 197 (only one is shown in FIG. 7) secured to vertical plate 146. The pair of cam followers 199 straddle vertical guide rail 198 which is welded to side plate 114. The vertical path of vertical plate 148 is guided by slide tongue 200 (only one is shown in FIG. 7) fixed to vertical plate 148. Slide tongue 200 rides in a vertical slide groove in grooved block 202 which is secured to side plate 110. Hard stop block 204 mounted to side plate 110 and set screw 206 threaded into flange 208 serve to define the lower limit of travel of vertical plates 146 and 148.

Also shown in FIGS. 4, 6 and 7 are fluid stream nozzles 210 and 212, these nozzles are connected by ordinary fluid coupling lines to any suitable source of compressed fluid 214 (see FIG. 4) and 216 (see FIG. 7), respectively through valve in valve and switch clusters 218 and 220, respectively. Any suitable fluid such as air, nitrogen, carbon dioxide and the like may be utilized. Generally, because of cost factors, the preferred fluid is air. The fluid is filtered prior to use to remove any undesirable particles which could deposit on and contaminate the web. The creation and removal of a compressed fluid from the relevant nozzle may be accomplished by activating solenoid operated valve in valve and switch cluster 218 (see FIG. 4) or 220 (see FIG. 7). The valves in valve and switch clusters may be conventional solenoid operated valves described above. Any other suitable valves and switches may be utilized, if desired. The valve and switches are normally actuated through suitable circuitry in response to a signal from a programmable controller. As described above, the control functions in the apparatus of this invention may be synchronized and integrated with any suitable programmable controller 56, such as an Allen Bradley Programmable Controller, Model No. 2/05 or Model No. 2/17. The programmable controller responds to various typical inputs including, for example, inputs from limit switches, timers, encoders, proximity sensors, counters and the like and utilizes these inputs for sequencing program outputs to activate or inactivate electric switches, solenoid operated valves that either vent a fluid nozzle to the ambient atmosphere or connect a fluid nozzle to a pressurized fluid source.

The fluid stream nozzles 210 and 212 may comprise a manifold containing a row or rows of holes, slots or any other suitable passages for directing a fluid stream such as air in an upward direction for nozzle 210 and in a downward direction for nozzle 212. Although the direction of the fluid streams need not be exactly vertical, the streams should be at a sufficient angle from horizontal to achieve the predetermined web shapes described herein. Where a plurality of fluid streams are used for nozzle 210 or 212, the streams may all be parallel to each other, slightly offset from each other (e.g. resembling a fan shaped pattern when viewed from one end of a nozzle manifold), or any other suitable pattern. A typical nozzle for nozzle 210 may be fabricated, for example, from half inch outside diameter polyvinyl chloride plastic pipe having one sixteenth diameter holes about 1 inch (2.54 centimeters) apart along the length of the upper surface of the pipe. The nozzle 210 is generally positioned transverse to the length of web 24 and the length of the nozzle is preferably about equal to the width of web 24. However, if desired, the length of the nozzle can be slightly longer than or slightly shorter than the width of the web 24 as long as the objectives of this invention are achieved. Typically, the holes of nozzle 210 are positioned between about 8 centimeters and about 10 centimeters below an imaginary extension of the plane extending along surface 67 of belt forming table 69. Nozzle 210 is also positioned between vacuum shoe 190 and the upstream edge of belt forming table 69. The holes or slots for nozzle 210 may be of any suitable shape such as round, oval, square, rectangular, convergent, divergent, and the like. The size of the holes selected for nozzle 210 depends on various factors such as the fluid pressure employed, the number of holes used, the spacing of the holes, the weight of the web, the speed of the web, porosity of the web, thickness of the web, and the like. If more than one hole is utilized, the holes may be arranged in any suitable pattern including, for example, one or more straight line rows, staggered patterns, circular pattern, and the like. However, the size, number and spacing of the holes for nozzle 210 is preferably sufficient to suspend the web on a cushion of flowing fluid and form an upwardly extending bulge in the web upstream from the leading edge. The upwardly extending bulge prevents the web 24 from rubbing on vacuum shoe 190. A typical nozzle for nozzle 212 is a commercially available flat fan spray nozzle such as Delavan ¼" ACM 6.5–90 degree brass that is mounted on the lower surface of plate 144. The nozzle is threaded into plate 144 with the fan spray pattern projecting transverse to the length of web 24. A single nozzle may be used where there are space constraints. Other applications may utilize multiple nozzles or a manifold type nozzle similar to nozzle 210. The size of the holes selected for nozzle 212 depends on various factors such as the fluid pressure employed, the number of holes used, the spacing of the holes, the weight of the web, the speed of the web, porosity of the web, thickness of the web, and the like. If more than one hole is utilized, the holes may be arranged in any suitable pattern including, for example, one or more straight line rows, staggered patterns, circular pattern, and the like. Typically, the outlets of the holes of nozzle 212 are positioned between about 20 centimeters and about 22 centimeters above an imaginary extension of the plane extending along surface 67 of belt forming table 69. Nozzle 212 is also positioned above and between vacuum shoes 182 and 190. However, the size, number and spacing of the holes for nozzle 212 are preferably sufficient to fully form a downwardly hanging U-shaped loop between shoes 182 and 190 by the time the leading edge of the web is transferred to vacuum shoe 190.

Figure 8:
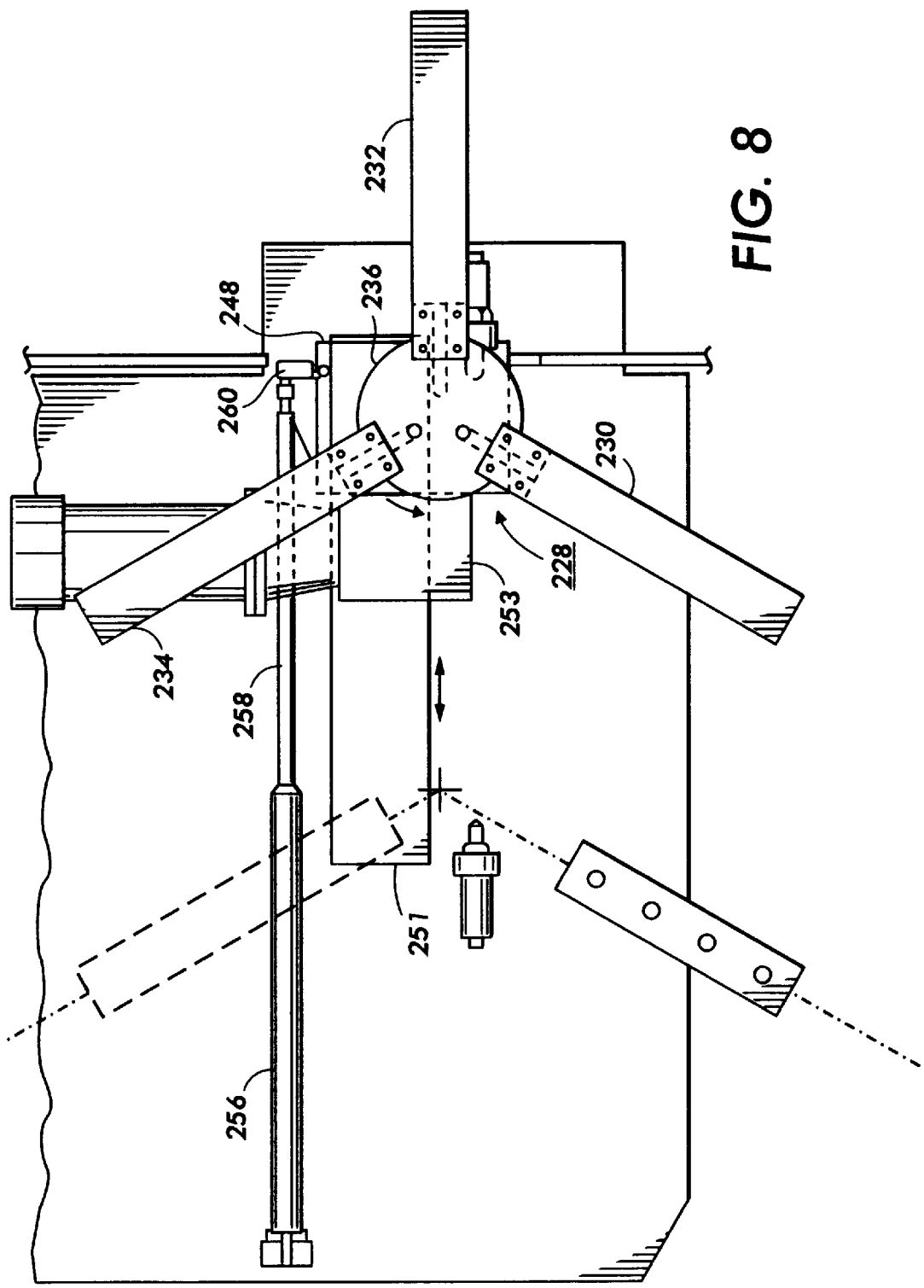
FIG. 8 is a schematic, sectional plan view of a belt transport assembly.
Figure 9:
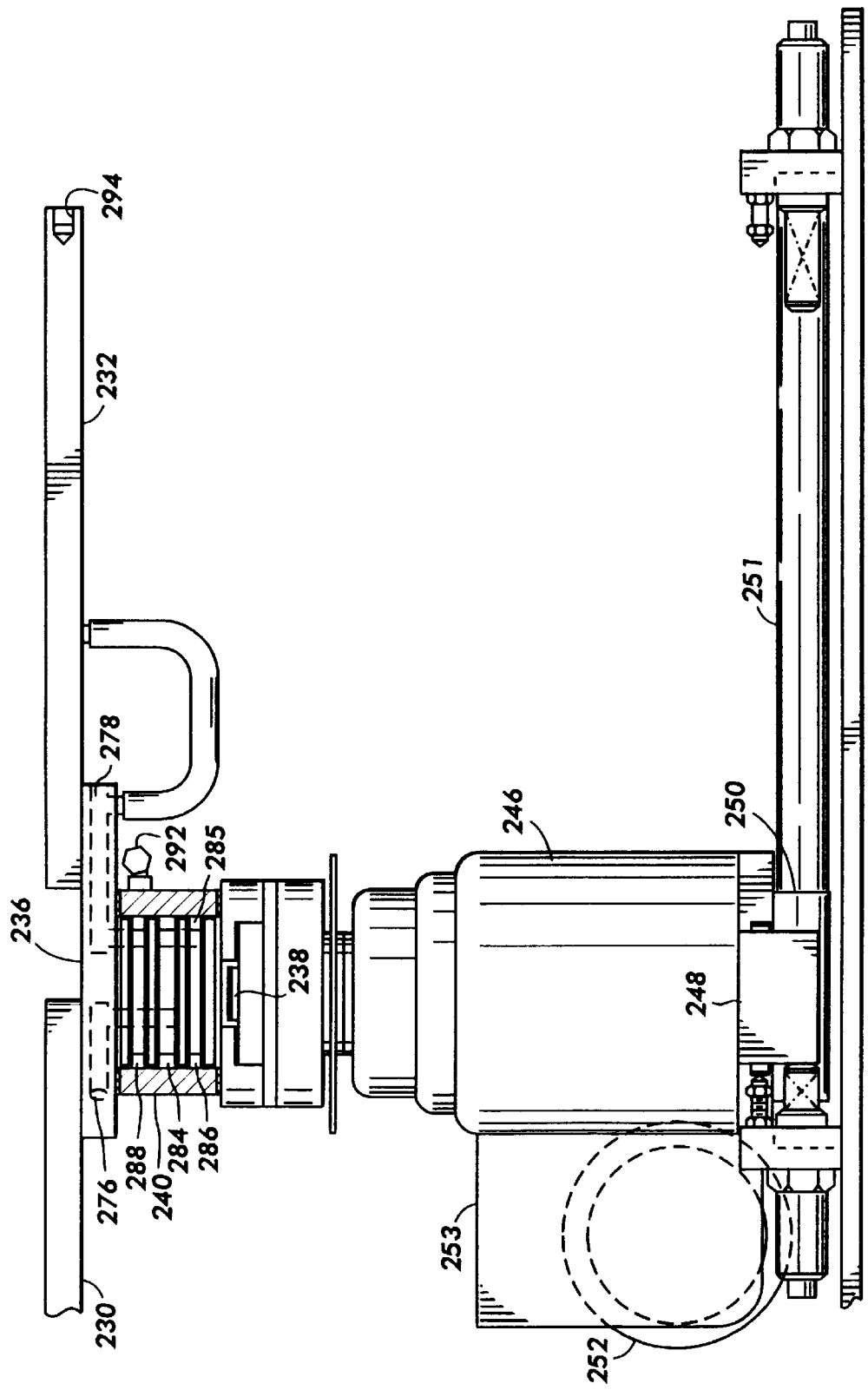
FIG. 9 is a schematic, sectional view in elevation of airways in a belt transport assembly.

Referring to FIGS. 8 and 9, belt transport assembly 228 is illustrated comprising three elongated anvils 230, 232, and 234. The elongated anvils are horizontally cantilevered 120° apart from a rotateable dial table 236 mounted to journal shaft 238 passing through journal box 240 into index housing 246. Journal box 240 and index housing 246 are secured to plate 248 bolted to a suitable ball bearing slide block 250 slideably mounted on a slide rail schematically represented by rectangle 251. Any suitable slide maybe employed to support stand 246. Typical slides include THK, Tokyo, Japan; Roller Slide, Solon, Ohio; and the like. Dial table 236 is adapted to rotate when journal shaft 238 is driven by electric motor 252 through suitable gearing in gear housing 253 attached o the side of stand 246. Dial table 236 is rotated when it is necessary to index each anvil from one processing station to the next. Slide block 250 is reciprocated between a fully retracted position (represented by phantom lines in FIG. 8) and an advanced load position by means of a suitable pneumatic cylinder 256 which drives a piston connecting rod 258 fastened to flange 260 mounted on the side of slide block 250. Pneumatic cylinder 256 is a conventional two-way acting cylinder in which piston movement is determined by which side of the piston is pressurized. Slide block 250 is reciprocated from the fully retracted position to the advanced load position by pneumatic cylinder 256 to facilitate loading of a freshly formed web loop (not shown) onto an empty anvil at belt loop forming station 10. Slide block 250 is reciprocated from the advanced load position to the fully retracted position by pneumatic cylinder 256 to allow indexing of anvils from the belt loop forming station 10 without an anvil striking any part of belt loop forming station 10. Timely actuation of electric motor 252 and pneumatic cylinder 256 are accomplished by programmable controller 56.

With reference to FIGS. 8 and 9, vacuum grooves on the upper surface of anvil 230 and 232 are independently connected through interior vacuum plenums to airways 276 and 278 (the third airway is not shown), respectively, that extend through journal box 240 to ports entering circumferential channels 284 and 285, respectively, each of the channels being separated by "O" ring seals 286. Circumferential channel 288 is connected to the third plenum by airways not shown. Circumferential channels 284, 285 and 288 are connected through corresponding air line through the journal box 240 to suitable electrically activateable valves (not shown). For example, in FIG. 9, circumferential channel 288 is shown connected to fitting 292 which in turn is coupled by a suitable hose (not shown) to an electrically activateable valve (not shown). The free end of each of the elongated anvils 230, 232 and 234 contains an alignment pin receiving hole 294 utilized in combination with alignment pins located at various processing stations and prevent undue deflection of the free end of elongated anvils 230, 232 and 234. For example an alignment pin 296 is shown below belt loop shaping assembly 132 in FIG. 5. Any suitable conventional solenoid operated valve may employed to provide vacuum or pressure to the components of this invention. Positive pressure, a vacuum or ambient air pressure may be supplied from any suitable conventional source to the journal box 240 by conventional means such as suitable air coupling lines (not shown). Conventional electrical switching is employed to couple or uncouple electric motors with an electrical power source through suitable circuitry in response to a signal from a suitable programmable controller 56 such as an Allen Bradley Programmable Controller, Model No. 2/05 or Model No. 2/17.

In operation, and with reference to the simplified belt forming timing sequence illustrated in FIGS. 10 through 15, reciprocating web pick up assembly 58 is initially at a retracted home position and pivotable plate 68 is pivoted up to raise vacuum shoe 82 (conveying gripper) up and away from the upper surface of web 24. The leading edge of web 24 is flush with cutting edge 48 as a result of shearing during the previous web loop forming cycle. Dancer roll 28 compensates for any tendency of slack to form in web 24 when reciprocating web pick up assembly 58 is in the retracted position and also assists in maintaining the upstream section of web 24 under continuous tension during the entire web loop forming operation. When reciprocating web pick up assembly 58 is in its retracted position, a vacuum is applied at vacuum shoe 52 to retain the leading edge of web 24 against web receiving platform 50.

Figure 10:
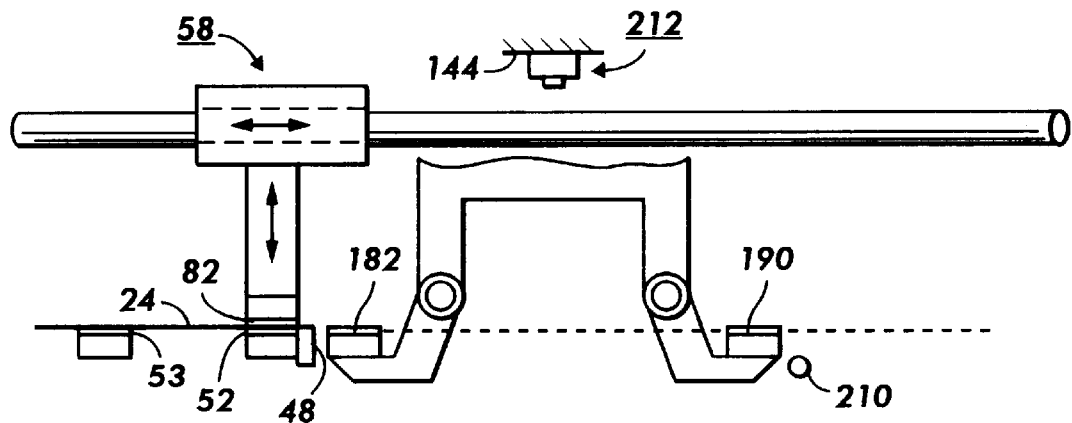
FIGS. 10 through 15 are simplified schematic, sectional views in elevation of a belt loop shaping assembly during different stages of the belt forming operation.
Figure 11:
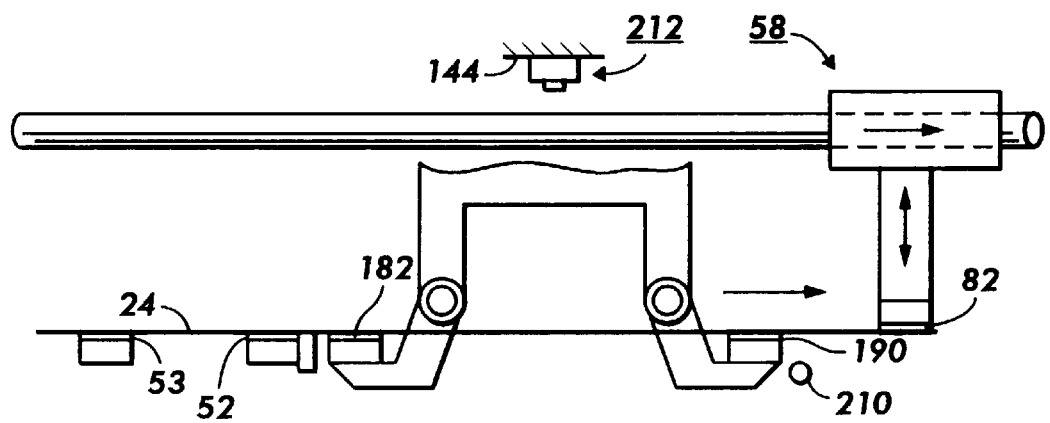

Reciprocateable looping assembly 145 is down in the home position with the vacuum shoes 182 (first invertible gripper) and 190 (second invertible gripper) facing upwardly. The upwardly facing surface of vacuum shoes 182 and 190 are at about the same plane as the upwardly facing surface of web receiving platform 50 (see FIGS. 4 and 5), upper surface 67 of belt forming table 69, and vacuum shoes 52 and 53 as shown in FIGS. 4 and 10. Pivotable plate 68 is then pivoted downwardly by activation of solenoid 74 to lower vacuum shoe 82 against upper surface (first major upwardly facing surface) of web 24. Vacuum is supplied to vacuum shoe 82 and the previously supplied vacuum to vacuum shoe 52 is terminated to allow vacuum shoe 82 to grip the upper surface adjacent the leading edge of the web. Pivotable plate 68 is then pivoted upwardly by inactivation of solenoid 74 to raise vacuum shoe 82 and lift the leading edge of web 24 from web receiving platform 50. Pressurized fluid is supplied to fluid passages 70 (see FIG. 4) by activation of valve in valve and switch cluster 73 to prevent contact between web 24 and upper surface 67 of belt forming table 69.

Reciprocating web pick up assembly 58 is thereafter substantially horizontally (represented by phantom lines in FIG. 4 and schematically illustrated in FIG. 11) advanced a predetermined distance past the slitting station to a first predetermined location downstream of the slitting station to the cutting position by activation of servomotor 88 to pull the desired length of web 24 past slitting or cutting edge 48 located on the downstream edge of web receiving platform 50. Servomotor 88 is inactivated, a vacuum is applied to vacuum shoe 53 (second predetermined location) to enable it to grip the bottom surface (second major downwardly facing surface) of web 24 and retain it against web receiving platform 50.

Figure 12:
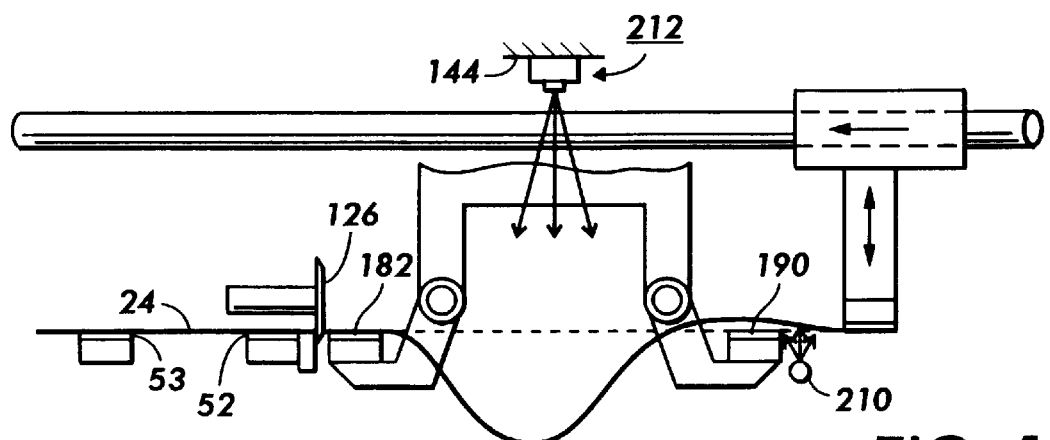

Servomotor 88 is activated to begin retracting reciprocating web pick up assembly 58 upstream of the first predetermined location toward the slitting station and toward vacuum shoe 190 (third predetermined location) to create slack between vacuum shoes 53 and 82 and to ensure that the web segment between vacuum shoes 182 and 190 begins to form a downwardly hanging loop (see FIG. 12). Application of a vacuum to shoe 53 is preferably continued to maintain in continuous tension the web upstream of vacuum shoe 53 and to isolate from this upstream tension, the part of the web downstream from vacuum shoe 53. Typical distances between vacuum shoe 53 and vacuum shoe 52 (fourth predetermined location) range from immediately adjacent to vacuum shoe 52 to about 25 cm upstream from vacuum shoe 52.

A vacuum is preferably applied to vacuum shoe 52 to enable it to grip the bottom (second major downwardly facing surface) of slack web 24 downstream of vacuum shoe 53 and retain web 24 against web receiving platform 50. A vacuum is applied to vacuum shoe 182 to enable it to grip the bottom of web 24. The vacuum applied to vacuum shoe 52 and to vacuum shoe 182 (fifth predetermined location) may be accomplished sequentially in any order or simultaneously. However, the vacuum is preferably applied to vacuum shoe 53 prior to application of a vacuum to either vacuum shoe 52 or vacuum shoe 182 so that tension can be removed from web 24 downstream of shoe 53. In other words, slack is preferably present in the web segment between vacuum shoes 53 and 82 prior to application of a vacuum to either vacuum shoe 52 or vacuum shoe 182 in order to achieve optimum results. Generally, the portion of the slack web bridging vacuum shoes 53 and 182 is substantially parallel to an imaginary plane extending along the outer surface of shoe 53, platform 50 and shoe 182. Preferably, vacuum shoe 52 and vacuum shoe 182 are positioned as close as possible to cutting edge 48, typically within about 3 cm from cutting edge 48.

Figure 13:
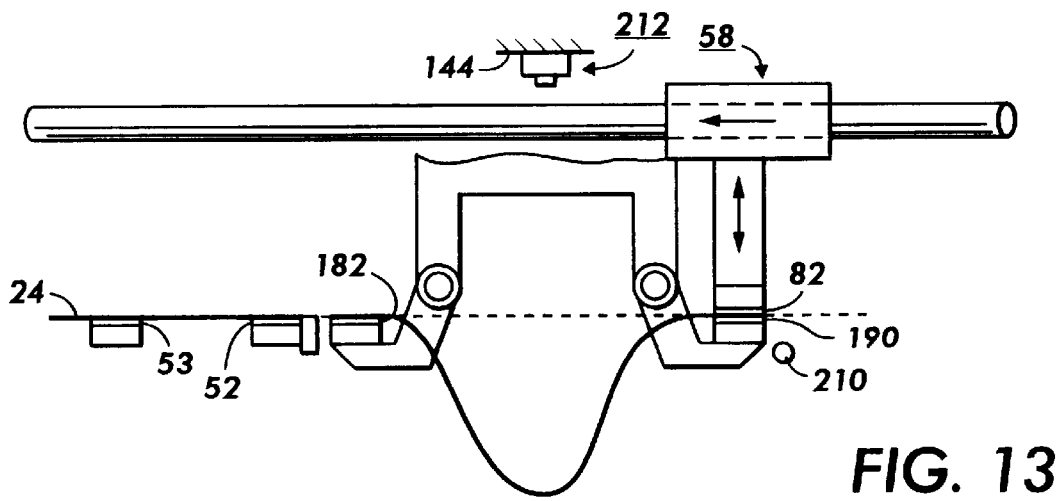

Pressurized air is then sequentially supplied first to the home position end and then the opposite end of hollow nonmagnetic shaft 208 to advance disc shaped cutting blade 126 from its home position (shown in FIG. 5) along cutting edge 48 and then back to its home position to shear web 24 (see also FIG. 12) thereby forming a web segment having a trailing edge opposite the leading edge. Servomotor 88 continues to retract reciprocating web pick up assembly 58 to position vacuum shoe 82 and the leading edge of Web 24 over vacuum shoe 190 a (third predetermined location) as shown in FIG. 13. Pivotable plate 68 is then pivoted downwardly by activation of solenoid 74 to lower vacuum shoe 82 as illustrated in FIG. 13 and vacuum is supplied to vacuum shoe 190. The vacuum supplied to vacuum shoe 82 is terminated to allow transfer of the leading edge of web 24 to vacuum shoe 190.

When servomotor 88 is activated to begin retracting reciprocating web pick up assembly 58 upstream of the first predetermined location toward the slitting station and toward vacuum shoe 190 (third predetermined location) to create slack between vacuum shoes 53 and 82 and to ensure that the web segment between vacuum shoes 182 and 190 begins to form a downwardly hanging loop (see FIG. 12). Pressurized fluid is supplied to fluid stream nozzle 210 (first fluid stream implement) by activation of valve in valve and switch cluster 218 (see FIG. 4) as reciprocating web pick up assembly 58 begins to move toward its home position. As illustrated in FIG. 12, the resulting fluid stream (first fluid stream) from nozzle 210 is directed against the region of the second major downwardly facing surface of the web immediately downstream of vacuum shoe 190 (third predetermined location) to support web 24 and cause web 24 to form an upwardly extending bulge upstream of the leading edge so that the region of web 24 between vacuum shoe 182 and vacuum shoe 82 remains out of contact with the upper surface 67 of belt forming table 69 and out of contact with vacuum shoe 190 as reciprocating web pick up assembly 58 is retracted upstream toward its home position. In other words, web 24 is supported by solid supports only at the leading and trailing edges. Substantially simultaneously, pressurized fluid is supplied to fluid stream nozzle 212 (second fluid stream implement) by activation of valve in valve and switch cluster 220 (see FIG. 7). As illustrated in FIG. 12, the fluid stream from nozzle 212 (second fluid stream) is directed in a downward direction against a region of the first major upwardly facing surface of the web between shoe 190 (third predetermined location) and shoe 52 (fourth predetermined location), i.e., between the leading edge and trailing edge as the leading edge is conveyed toward the trailing edge, to ensure complete formation of a downwardly hanging U-shaped loop in the web 24 while web 24 is held out of contact from vacuum shoe 190 and out of contact from the upper surface 67 of belt forming table 69 during retraction of reciprocating web pick up assembly 58. Although initiation of the supplying of pressurized fluid to nozzles 210 and 212 can occur simultaneously or sequentially in any order, the time interval for sequential initiation of the supplying of pressurized fluid should be sufficiently brief to ensure that web 24 does not contact the upper surface 67 of belt forming table 69 nor contact vacuum shoe 190 until the leading edge of web 24 is transported by vacuum shoe 82 to vacuum shoe 190. Simultaneous initiation of the supplying of pressurized fluid will not cause the air stream from nozzle 212 to overcome the air stream from nozzle 210 whereby web 24 contacts vacuum shoe 190 or belt-forming table 69 because the distance between the web 24 and nozzle 210 is different than the distance between web 24 and nozzle 212. The fluid pressures to be employed depend upon the dimensions of the web to be supported, the web suspension distances desired, the number, spacing and opening size of the openings in the nozzles, speed of the web, beam strength of the web, and the like. Regulation of fluid pressure may be accomplished by any suitable and conventional device such as a needle valve, pressure release valve, hose internal diameter size, and the like located in any suitable location of the fluid supply system. In any event, the fluid pressure to nozzle 210 should be sufficient to produce a fluid stream which floats the web on a cushion of flowing fluid and stream to form an upwardly extending bulge in the web upstream from the leading edge which prevents contact of the web with the vacuum shoe 190 and upper surface 67 of belt forming table 69 prior to transfer of the leading edge to vacuum shoe 190, but not so great as to cause contact of the web with other machine components located above web 24. Generally, the fluid stream should be sufficient to maintain a distance between the underside of web 24 and upper surface of vacuum shoe 190 of between about 20 millimeters and about 40 millimeters until just prior to transfer of the leading edge of web 24 from vacuum shoe 82 to vacuum shoe 190. A typical air pressure for nozzle 210 is between about 5 pounds per square inch (351 grams per square centimeter) and about 15 pounds per square inch (1054 grams per square centimeter). For nozzle 212, the fluid pressure should be sufficient to produce a fluid stream which ensures complete (rather than partial) formation of the U-shape in the region of web 24 between vacuum shoes 182 and 190 while simultaneously avoiding premature forcing of web 24 against vacuum shoe 190 prior to transfer of the leading edge of web 24 from vacuum shoe 82 to vacuum shoe 190. A typical air pressure for nozzle 212 is between about 5 pounds per square inch (351 grams per square centimeter) and about 15 pounds per square inch (1054 grams per square centimeter) for a 75 micrometer thick polyethylene terephthalate web coated with coatings having a total thickness of about 27 micrometers. Termination of the supplying of pressurized fluid to nozzle 210 may be effected by inactivation of valve in valve and switch cluster 218 (see FIG. 4) as reciprocating web pick up assembly 58 reaches vacuum shoe 190. Termination of the supplying of pressurized fluid to nozzle 212 is accomplished by inactivation of valve in valve and switch cluster 220 (see FIG. 7) as reciprocating web pick up assembly 58 reaches vacuum shoe 190. As illustrated in FIG. 13, the fluid stream from nozzle 212 has ensured that the U-shaped loop in the region of web 24 between vacuum shoe 182 and vacuum shoe 190 is fully formed prior to inverting and overlapping of the leading and trailing edges. If desired, termination of pressurized fluid to fluid stream nozzles 210 and 212 can occur simultaneously or sequentially in any order, the interval for any sequential termination of the supplying of pressurized fluid being timed to ensure that web 24 does not contact the upper surface 67 of belt forming table 69 nor contact vacuum shoe 190 until the leading edge of web 24 is transported by vacuum shoe 82 to vacuum shoe 190. Application of a vacuum to shoe 53 is preferably continued to maintain in continuous tension the web upstream of vacuum shoe 53 and to isolate from this upstream tension, the part of the web downstream from vacuum shoe 53.

Figure 14:
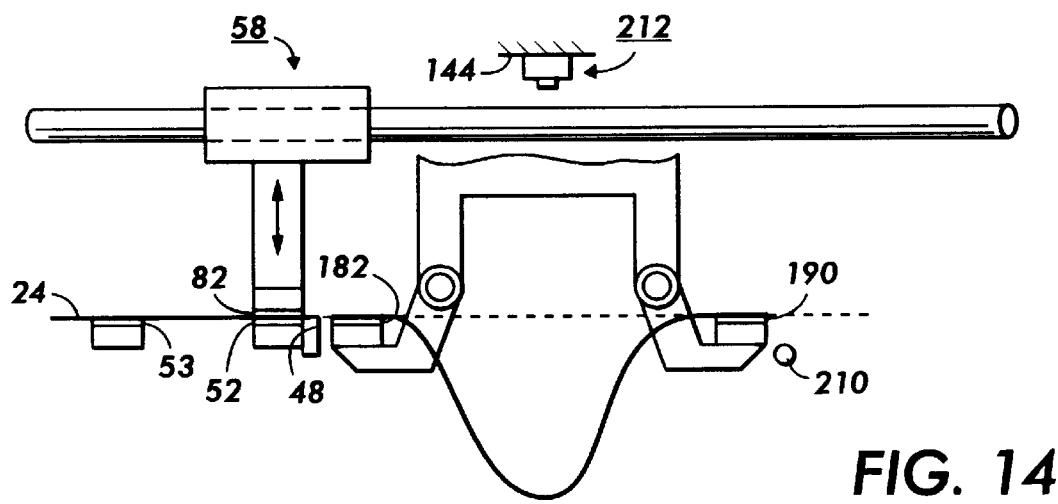

Referring to FIGS. 1, 4 and 13, pivotable plate 68 is pivoted upwardly by inactivation of solenoid 74 to raise vacuum shoe 82 away from vacuum shoe 190 and reciprocating web pick up assembly 58 is thereafter retracted to its home position over vacuum shoe 52 by activation of servomotor 88 as shown in FIG. 14. The vacuum supplied to vacuum shoe 52 is terminated to allow movement of the leading edge during the next belt forming cycle.

Figure 15:
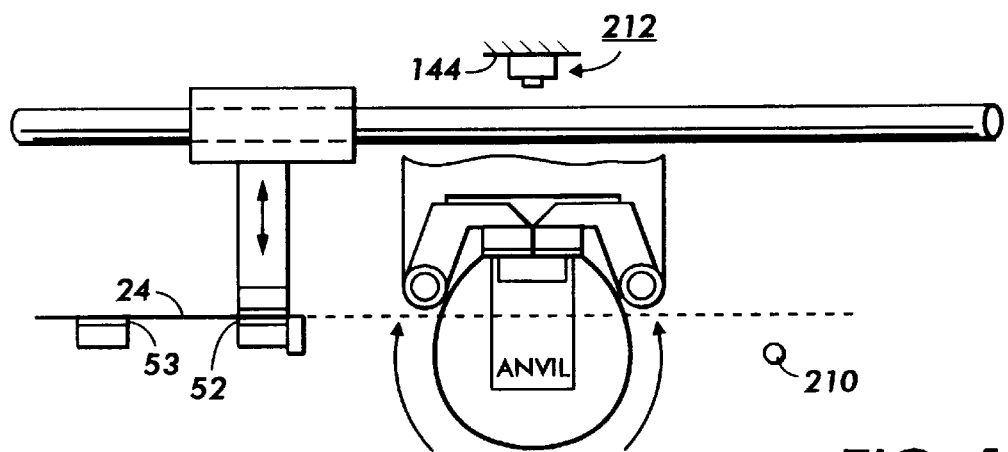
Figure 16:
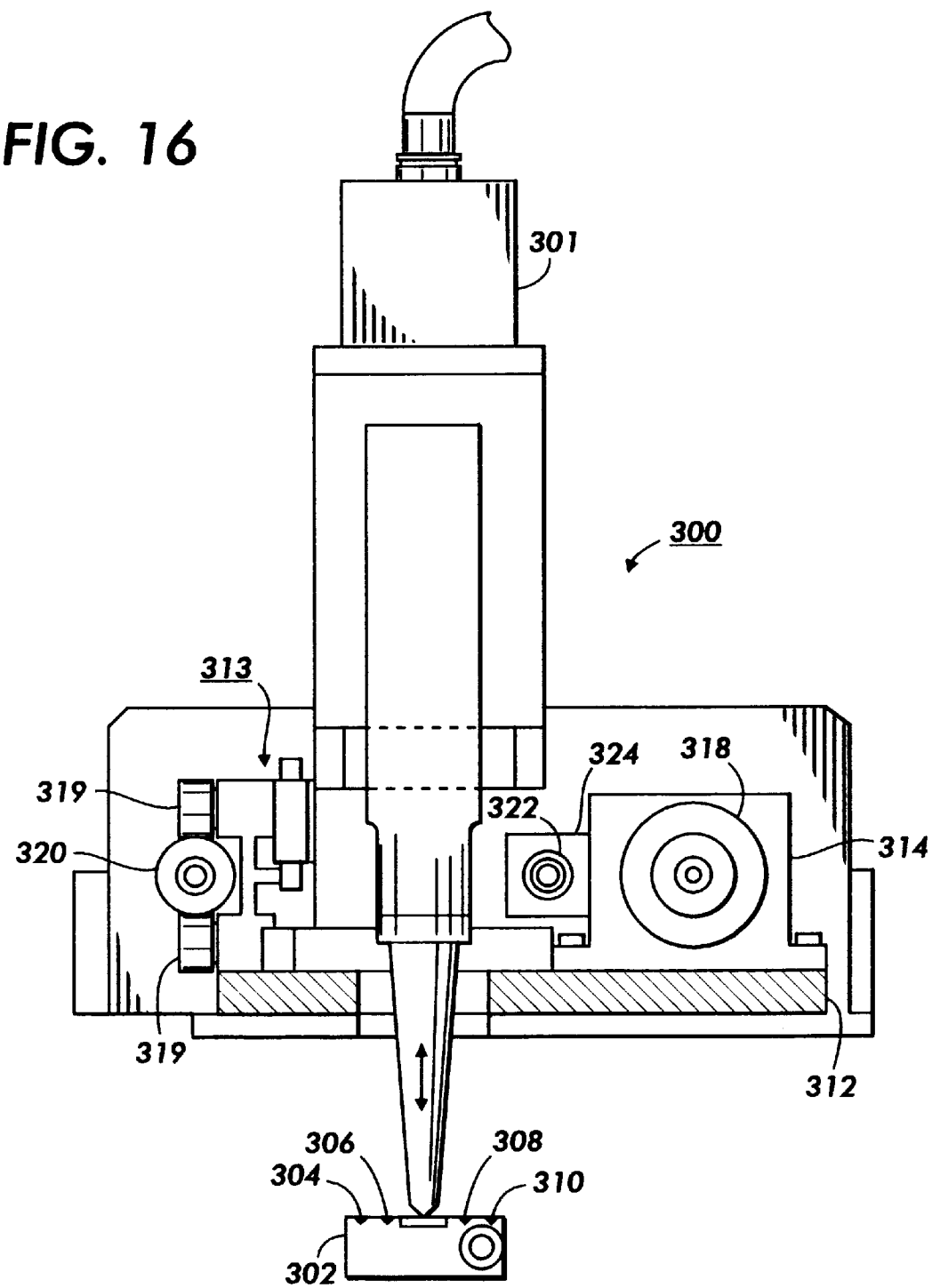
FIG. 16 is a schematic, sectional view in elevation of a welding means for welding belts on an anvil.

Anvil 232 is indexed in a linear direction into position under reciprocateable looping assembly 145 in preparation for receipt of a newly formed web loop by activation of pneumatic cylinder 256 (see FIG. 8). The alignment pin receiving hole 294 located at the free end of elongated anvil 232 engages alignment pin 296 (see FIG. 5) which is securely mounted to side plate 110 by brackets (not shown) to stabilize anvil 232. A vacuum is supplied to vacuum grooves (not shown) on the upper surface of anvil 232. Pneumatic cylinder 162 or any other suitable drive mechanism such as an electric motor is activated to rotate vacuum shoe 182 around shaft 154 carrying the trailing edge of the web segment in a clockwise arc, inverting the trailing edge of the web segment and bringing the trailing edge into contact with the upper surface of anvil 232. Pneumatic cylinder 176 or other suitable drive mechanism such as an electric motor is then activated to rotate vacuum shoe 190 around shaft 165 thereby simultaneously carrying the leading edge of the newly formed web segment in a counter clockwise arc and completely inverting the leading edge as shown in FIG. 15 to form a belt loop having a lap joint in which the leading edge overlaps the trailing edge. By reversing the sequence of inverting vacuum shoes 182 and 190, a belt may be prepared in which the trailing edge overlaps the leading edge. This is particularly useful for achieving different lap joints from a rolled web having one edge that is different from the opposite edge, e.g. only one edge carries a grounding strip. The vacuum supplied to vacuum shoes 182 and 190 is terminated to allow transfer of the newly formed belt loop to the upper surface of anvil 232. Pneumatic cylinder 140 is activated to raise reciprocateable belt looping assembly 145, including vacuum shoes 182 and 190, away from the newly formed belt loop carried on the upper surface of anvil 232 thereby facilitating removal of the transferred belt loop. Pneumatic cylinder 256 is activated to retract anvil 232 away from under reciprocateable looping assembly 145 in preparation for welding (see phantom lines in FIG. 8). Pneumatic cylinder 140 is activated to return reciprocateable looping assembly 145, including vacuum shoes 182 and 190, to their original home position. Pneumatic cylinders 162 and 176 are then activated to rotate vacuum shoes 182 and 190 to their original upwardly facing positions. Electric motor 252 is activated to rotate dial table 120° and convey the newly formed belt loop carried on anvil 232 to belt welding station 12 If the fresh web to be processed next is free of defects, a normal belt forming cycle is begun.

Referring to FIGS. 1, 11, 12 and 18, an ultrasonic belt welding station 12 comprising an ultrasonic horn and transducer assembly 300 is illustrated. A solenoid 301 is mounted above ultrasonic horn and transducer assembly 300 to extend or retract ultrasonic horn and, transducer assembly 300 in a vertical direction. The web lap joint (not shown) formed by the overlapping segment ends of thermoplastic web 24 is supported by the upper surface of anvil 302 and held in place below the path of ultrasonic horn and transducer assembly 300 by suction from parallel rows of grooves 304, 306, 308 and 310. The ultrasonic horn and transducer assembly 300 is supported by the lower end of a vertically reciprocateable shaft (not shown) extending from the lower end of solenoid 301 mounted to the upper hinged half 311 of a substantially horizontally reciprocateable carriage 313. One side of the lower hinged half 312 of carriage 313 is suspended from pillow blocks 314 and 316 which in turn slide on horizontal bar 318. The other of carriage 313 is suspended from a pair of cam followers 319 that roll on the outer surface of horizontal bar 320. A rotateable lead screw 322 drives horizontally reciprocateable carriage 313 through ball screw 324 secured to carriage 313. Horizontal bars 318 and 320 as well as lead screw 322 are supported at each end by flanges 326 and 328 which are secured to frame assembly 330 (see FIG. 1). Lead screw 322 is rotated by a belt 331 driven by electric motor 332 which is also supported by frame assembly 330. An alignment pin 333 (see FIG. 1) is mounted to frame assembly 330 and is adapted to mate with alignment pin receiving hole 294 at the free end of anvil 302 when anvil 302 is indexed into position for welding of the belt lap joint. Adjustable set screw 334 is positioned to extend upwardly from the lower hinged half 312 of carriage 313 to assist in maintaining a predetermined spacing between the bottom of the ultrasonic horn of horn and transducer assembly 300 and the top of anvil 302 and to ensure a uniform pressure on the web lap joint as the bottom of the ultrasonic horn traverses the lap joint. The end of set screw 334 rests against the bottom of upper hinged half 311 of carriage 313. The upper hinged half 311 and lower hinged half 312 of carriage 313 are joined by a hinge comprising a thin metal shim 338 fastened to upper hinged half 311 by bolted plate 340 and fastened to lower hinged half 312 by bolted plate 342. The hinge allows upper hinged half 311 of carriage 313 and ultrasonic horn of horn and transducer assembly 300 to pivot along the hinge during welding to compensate in a substantially vertical direction for any irregularities encountered along the lap joint 301 during welding. An air bellows 344 is positioned between upper hinged half 311 and lower hinged half 312 of carriage 313 to adjust the pressure of the bottom of the ultrasonic horn 300 against the web lap joint, e.g. to function as a counterbalance.

Figure 17:
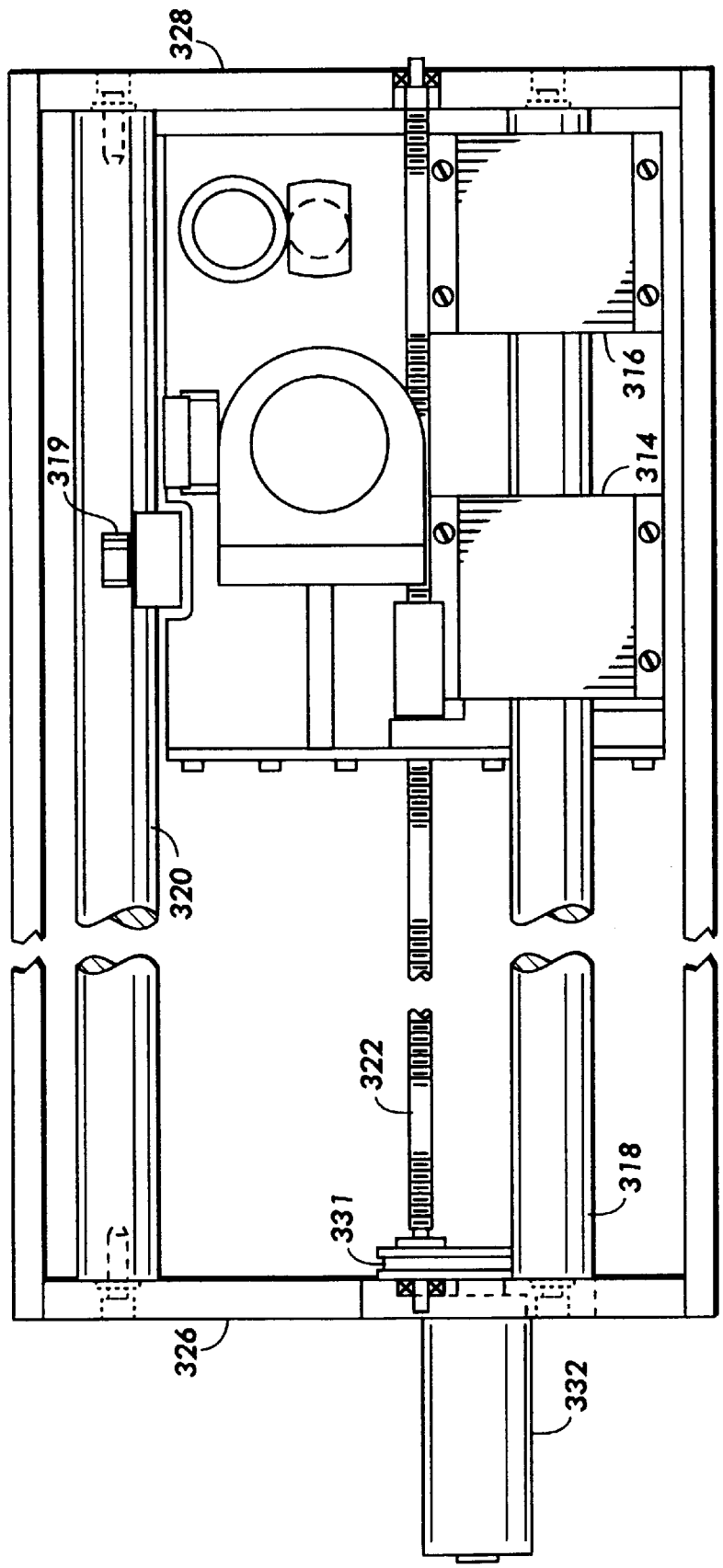
FIG. 17 is a schematic, sectional plan view of a welding means for welding belts on an anvil.
Figure 18:
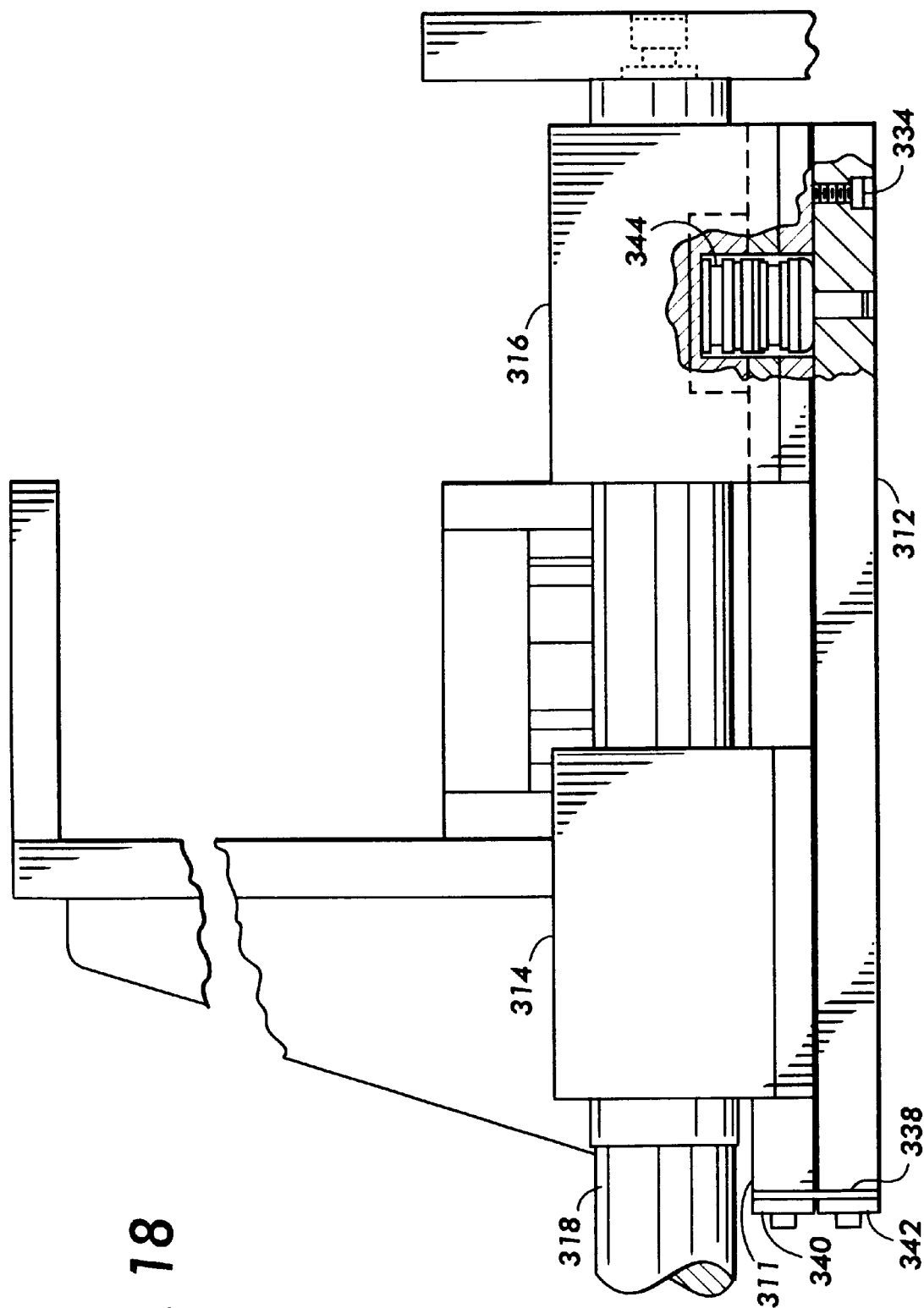
FIG. 18 is a schematic, sectional view in elevation of a welding means for welding belts on an anvil.

In operation, ultrasonic horn and transducer assembly 300 is in a retracted position because solenoid 301 is activated. Anvil 302 carrying a looped segment of web severed from web 24 at belt loop forming station 10 was previously withdrawn in a linear direction from under reciprocateable looping assembly 145 (see FIG. 7) and indexed to rotate it and the belt welding station 12. Indexing was achieved by providing power to electric motor 252 (see FIGS. 8 and 9) to rotate anvil 302 by means of suitable means such as bevel gears in gear housing 253 and journal shaft 238 to simultaneously advance anvil 302 bearing an unwelded belt loop to web welding station 12, advance an anvil bearing a welded belt to belt discharge station 15 from belt welding station 12, and advance an empty anvil from belt discharge station 15 into to position for linear transport into belt loop forming station 10. Upon arrival of anvil 302 at belt welding station 12, solenoid 301 is inactivated to extend the transducer in ultrasonic horn and transducer assembly 300 toward anvil 302, the transducer in ultrasonic horn and transducer assembly 300 is activated, electric motor 332 (see FIG. 17) is activated to drive lead screw 322 which in turn moves horizontally reciprocateable carriage 313 over the lap joint of the web loop carried by anvil 302, and solenoid 345 (see FIG. 1) is activated to drive alignment pin 333 into alignment pin receiving hole 294 located at the free end of anvil 302.

Lowering of the transducer in ultrasonic horn and transducer assembly 300 by inactivation of solenoid 301 brings the ultrasonic horn into compressive engagement with the seam of the overlapping ends of web 24. The welding surface of the ultrasonic horn in ultrasonic horn and transducer assembly 300 may be of any suitable shape such as the flat or curved cross-sectional shapes illustrated, for example, in U.S. Pat. No. 3,459,610 and U.S. Pat. No. 4,532,166, both of which are incorporated herein by reference in their entirety. The high vibration frequency of the ultrasonic horn along the its vertical axis causes the temperature of at least the contiguous overlapping surfaces of thermoplastic web 24 to increase until at least the thermoplastic material in web 24 flows. Welding of the contiguous overlapping surface of thermoplastic web 24 will also occur if web 24 also comprises thermoplastic material which flow as a result of the applied energy of ultrasonic oscillations. The thermoplastic web 24 may be coated with thermoplastic coatings. The thermoplastic material that is induced to melt and weld the seam may be provided solely by a coating on the web, from both a coating and a web substrate, or solely from the web itself. The web may be of any suitable thickness which will allow adequate heating of the contiguous overlapping surfaces of the web edges to permit sufficient heat energy to be applied at the contiguous overlapping surfaces to cause the thermoplastic material to melt and weld the overlapping edges of web 24 at seam 138. Any suitable heating technique may be used to provide the heat necessary at the contiguous overlapping surfaces to melt the thermoplastic material and cause it to weld web 24 at the lap joint. Typical heating techniques include ultrasonic welding, radio frequency heating and the like. Ultrasonic welding is preferred because it causes generation of heat at the contiguous overlapping surfaces of the web edges at the lap joint to maximize melting of the thermoplastic material. If desired, the horn may comprise highly thermoconductive material such as aluminum to ensure achievement of higher temperatures at the interface between the overlapping edges of web 24 and to minimize thermal distortion of the exposed surfaces of the web 24. When ultrasonic welding is utilized it is believed that the rapid impaction of one edge of web 24 with the other edge of web 24 at the contiguous overlapping web surfaces between the anvil 302 and ultrasonic horn causes generation of heat. A horn vibration frequency of about 16,000 kHz or higher may be utilized to cause the thermoplastic material to soften. A typical horn suitable for joining thin thermoplastic webs utilizes a sonic generation of about 400–800 watt capacity, an operational frequency of about 20 kHz, and a flat input horn welding surface about 12 millimeters long and about 0.04 to 0.1 centimeter wide. A typical motion amplitude for this horn is about 76 micrometers. The combined weight of about 2.5 kilograms for the solenoid 301, ultrasonic horn and transducer assembly 300, and upper hinged half 311 of carriage 313 is sufficient to bring to horn into forced contact with the lap joint. However, air bellows 344, a spring bias, weights, counterweights, or other suitable means may be utilized to increase or decrease the contact force. Since heat is generated very rapidly at the interface of the overlapping web ends at the lap joint with this type of device, sufficient heat to cause the thermoplastic materials to melt can occur typically in about 0.2 second as the horn traverses the along the lap joint.

As the horn is lowered to the lap joint of web 24, electrical power is supplied to the transducer in ultrasonic horn and transducer assembly 300 and electric motor 332 is activated to drive lead screw 322 which in turn moves horizontally reciprocateable carriage 313 and ultrasonic horn 300 along the lap joint of web 24. After carriage 313 completes its traversal of the lap joint, solenoid 301 is activated to retract the transducer in ultrasonic horn and transducer assembly 300 away from anvil 302, the transducer in ultrasonic horn and transducer assembly 300 is inactivated, solenoid 345 is inactivated to remove alignment pin 333 from alignment pin receiving hole 294, and electric motor 332 is reversed to return horizontally reciprocateable carriage 313 to its starting position.

Upon completion of welding of the lap joint (not shown) of web 24 at belt welding station 12, the welded belt contains flashings at each end of the welded lap joint. These joints extend beyond the sides of the belt and are undesirable for many machines such as electrostatographic copiers, duplicators and copiers that require precise edge positioning of the belts during machine operation. However, some machines that require precision edge positioning, require it on one side only so that notching or trimming of the other side is not essential. Thus, the anvil bearing the freshly welded belt is preferably transported in a linear direction from belt welding station 12 to belt notching station 14 (see FIGS. 1 and 8) at the same time that another empty anvil cantilevered from rotateable dial table 236 is conveyed in a linear direction to belt loop forming station 10 to receive a newly formed belt loop.

In operation, anvil 356 bearing a freshly welded belt is indexed in a linear direction from belt welding station 12 to belt notching station 14 (see FIGS. 1 and 8) at the same time that another empty anvil cantilevered from rotateable dial table 236 is conveyed in a linear direction to belt loop forming station 10 to receive a newly formed belt loop. After anvil 356 is in position for notching, pneumatic cylinder 370 is activated to drive alignment pin 368 into alignment pin receiving hole 294 located at the free end of anvil 356 to stabilize anvil 356. Pneumatic cylinders 358 and 360 are then activated to drive punch cutters 362 and 364 downwardly into dies located in anvil 356 adjacent to each end of welded lap joint of the belt carried by anvil 356. A vacuum is supplied to anvil 356 to maintain the welded belt in position while the flashings are removed during the notching operation.

Any suitable thin, flexible web comprising a thermoplastic layer may be used in the apparatus and process of this invention. The web may comprise a single layer or a plurality of layers in which at least one of the layers comprises thermoplastic material. any suitable thermoplastic, polymeric material which will melt at the temperatures generated at the contiguous overlapping web surfaces of the seam may be utilized. Typical thermoplastic, polymeric materials include polyethylenes, polypropylenes, polycarbonates, polyvinylacetate, terephthalic acid resins, polyvinylchloride, styrene-butadiene copolymers and the like. The thermoplastic material that is induced to melt and weld the seam may be provided solely by a thermoplastic coating on the web, from both a coating and a web substrate, or solely from the web itself. Thus, for example, a nonthermoplastic coating on the web, from both a coating and a web substrate, or solely from the web, itself. Thus, for example, a nonthermoplastic web substrate may be coated with a thermoplastic material which is the sole source of the material which melts. provided solely by a thermoplastic coating on the web, from both a coating and a web substrate, or solely from the web itself. Thus, for example, a nonthermoplastic web substrate may be coated with a thermoplastic material which is the sole source of the material which melts. Alternatively, for example, the web may be uncoated and consist entirely of the thermoplastic material, some of which melts to weld the seam. The web may be of any suitable thickness which will allow adequate heating of the contiguous overlapping surfaces of the web edges to permit sufficient heat energy to be applied at the contiguous overlapping surfaces to cause the thermoplastic material to melt and weld the overlapping edges of web at the seam. Preferred web thicknesses for use with ultrasonic welding can range from between about 25 micrometers to about 0.5 millimeter. Thicker webs may be utilized as long as sufficient heat is applied to the contiguous overlapping surfaces of the web to cause the thermoplastic material to melt. Webs having a thickness up to about 10 millimeters may be joined with the process and apparatus of this invention.

COMPARATIVE EXAMPLE I

A web was provided comprising of a polyester film (Mylar, available from E.I. duPont de Nemours and Co.) having a width of about 48.3 cm and a thickness of about 76 micrometers and having a coating on one side of a polycarbonate having a thickness of about 18 micrometers and coatings on the second side comprising a siloxane charge blocking layer having a thickness of about 0.1 micrometer, a charge generating layer comprising finely divided photoconductive pigment particles dispersed in a film forming polyvinyl binder and having a thickness of about 0.2 micrometer, and a charge transport layer comprising charge transporting small molecules dissolved in a polycarbonate film forming binder having a thickness of about 25 micrometers. This web had a negative curl. In other words, the web had a convex or U-shaped shaped cross section (viewed longitudinally of the belt) with the bottom surface of the belt presenting to the surface of the belt forming table a bottom of a dome.

This web was processed in an apparatus similar to the apparatus illustrated in the drawings, except that nozzles corresponding to 210 and 212 in the drawings and associated air supply were not used. The leading edge of the web from a supply roll was fed over cylindrical air bearings from a supply roll over a support platform at a belt loop forming station. The end of the web was flush with the far cutting edge of the platform (relative to the location of the supply roll) as a result of shearing during a previous belt forming cycle. The end of the web was held to the far edge of the platform by a vacuum applied to a first vacuum shoe comprising apertures in the platform adjacent the end of the web and far end of the platform (similar to the arrangement for vacuum shoe 52 shown in FIGS. 4, 5, and 10 through 15). Tension was maintained in the web between the apertures in the first vacuum shoe and the supply roll by a dancer roll having a cylindrical air bearing. An anvil having a width of about 10 cm and a length of about 50 cm cantilevered from a rotateable stand was transported from a belt discharge station to the belt loop forming station by rotation of the stand. Upon arrival of the anvil at the belt forming station, a horizontally reciprocateable vacuum pick up arm with a second vacuum shoe comprising vacuum apertures (similar to the arrangement for vacuum shoe 82 shown in FIGS. 4, 5, and 10 through 15) was brought into contact with the upper surface of the leading edge of the web. The web was transferred from the platform to the second vacuum shoe in the pick arm by supplying a vacuum to the second vacuum shoe of the pick up arm and terminating the vacuum applied to apertures of the first vacuum shoe in the platform adjacent the end of the web. The web was pulled under tension from the supply roll by advancing the vacuum pick up arm away from the cutting edge of the platform over a belt forming table to the desired belt length of about 20–60 cm from the cutting edge. The belt forming table contained a plurality of air passages from which streams of air were expelled against the bottom of the web in an attempt to maintain the belt out of contact with upper surface of the belt forming . The belt passed over a pair of pivotable arms having a cross section resembling that of the clawed legs of a crab facing upwards except that upwardly facing vacuum shoes were positioned where claws would normally be located. One of the pivotable arms was adjacent to the cutting edge and the other was positioned downstream in the direction in which the web was pulled by the vacuum pick up arm. Vacuum was applied to the apertures in the first vacuum shoe located at the edge of the platform and to a third shoe carried on the pivotable arm closest to the platform (hereinafter referred to as arm A). The web was sheared at the cutting edge. The vacuum pick up arm was retracted to move the leading edge of the web back toward the cutting edge and over a fourth vacuum shoe on the downstream pivotable arm (hereinafter referred to as arm B) where the leading edge of the web is transferred by supplying vacuum to the vacuum shoe of arm B and terminating supply of vacuum to the vacuum pick up arm. The convex shape of the web did not allow a cushion of air to build up under the photoreceptor web and greatly reduced the ability of the web to float over the surface of the belt forming table. This allowed the belt to come into direct contact with the belt forming table thereby increasing friction between the table and the web. With this excess friction, the force of gravity was not sufficient to pull the web segment down between the third vacuum shoe carried on pivotable arm A and the fourth vacuum shoe carried on pivotable arm B as the leading edge of the web was conveyed by the vacuum pick up arm to and the fourth vacuum shoe carried on pivotable arm B. Thus, this belt fabrication process could not proceed because rotation of arms A and B would not lead to the formation of an acceptable photoreceptor belt.

EXAMPLE II

The process of Example I was repeated except that air nozzles were positioned at locations that corresponded to the locations of air nozzles 210 and 212 shown in FIGS. 4, 6, 7 and 10 through 15. The air nozzle corresponding to nozzle 210 was a polyvinyl chloride pipe having an outside diameter of (0.5 inch 1.27 centimeters). This pipe had ¹⁄₁₆ inch (1.6 millimeters) holes drilled along the top of the pipe from one end to the other. Both ends of the pipe were capped. The pipe was 20 inches (50.8 centimeters) long and was positioned between the fourth vacuum shoe carried on pivotable arm B and the upstream edge of the belt forming table. The top of the pipe was 10 centimeters below an imaginary extension of the plane of the upper surface of the belt forming table. The horizontal distance between the top of the pipe and the downstream edge of the forth vacuum shoe was 20 centimeters. The air nozzle corresponding to nozzle 212 was a commercially available flat fan spray nozzle (Delavan ¼" ACM 6.5–90 degree brass) that was mounted on the lower surface of plate 144. The bottom of the nozzle was positioned 20 centimeters above an imaginary extension of the plane of the upper surface of the belt forming table and positioned above the midpoint of an imaginary line extending from the third vacuum shoe carried on pivotable arm A to the fourth vacuum shoe carried on pivotable arm B. When the process described in Example I was repeated with the two new air nozzles, compressed air was fed to both air nozzles after the web was pulled from the supply roll by the vacuum pick up arm away from the cutting edge and over a belt forming table. Air to the nozzle corresponding nozzle 210 was supplied at 5–15 pounds per square inch and air to the nozzle corresponding nozzle 212 was supplied at 5–15 pounds per square inch. Although the web had a convex shape, the additional air provided by the nozzle corresponding to nozzle 210 provided a stable cushion of air under the photoreceptor web and prevented contact between the web and the surface of the belt forming table and the forth vacuum shoe carried on pivotable arm B. This elimination of frictional contact coupled with the stream of air from the nozzle corresponding to nozzle 212 and the force of gravity enabled successful movement of the web segment down between the third vacuum shoe and the fourth vacuum shoe to form an acceptable U-shape in the web as the leading edge of the web was conveyed by the vacuum pick up arm to the fourth vacuum shoe. The vacuum pick up arm was returned to its home position upstream from the cutting edge over the first vacuum shoe after the leading edge of the web was transferred to the fourth vacuum shoe. A rotary dial supporting three cantilevered welding anvils was moved with a linear motion to insert the free end of the one of the anvils between the arms A and B. A vacuum was applied to a pair of rows of apertures on each side of the centerline of the inserted anvil. Arms A and B were pivoted to invert their vacuum shoes against the upper surface of the inserted to form an acceptable loop. The vacuum supplied to the shoes carried by arms A and B was terminated to effect transfer of the belt loop to the anvil. Arms A and B were then retracted sufficiently to provide clearance for anvil removal. A linear movement in a direction along the axis of the anvil toward the stand was imparted to the anvil to remove the belt loop and anvil from the belt loop forming station. Once the free end of the mandrel bearing the newly formed belt loop cleared the belt loop forming apparatus, it was advanced by the rotateable stand to a belt welding station where the lap joint of the web was welded with an ultrasonic welding horn. The resulting belt was of high quality with no detectable defects.

Although the invention has been described with reference to specific preferred embodiments, it is not intended to be limited thereto rather those skilled in the art will recognize that variations and modifications may be made therein which are within the spirit of the invention and within the scope of the claims.

What is claimed is:

1. A process for fabricating a flexible belt comprising conveying the leading edge of a flexible web from a supply roll to a slitting station, slitting the web a predetermined distance from the leading edge to form a web segment having the leading edge at one end and a trailing edge at the opposite end, conveying the leading edge toward the trailing edge, flowing at least one stream of fluid upwardly against the web segment to form an upwardly extending bulge in the segment adjacent the leading edge, flowing at least one stream of fluid downwardly against the web segment to form the web segment into a U-shape, overlapping the leading edge and the trailing edge of the web segment to form a joint, and welding the joint to permanently join the leading edge and the trailing edge together to form a belt.

2. A process according to claim 1 wherein the sequence of the overlapping of the leading edge of the web segment and the trailing edge forms a joint in which the leading edge overlies the trailing edge.

3. A process according to claim 1 wherein the sequence of the overlapping of the leading edge of the web segment and the trailing edge forms a joint in which the trailing edge overlies the leading edge.

4. A process for fabricating a flexible belt comprising
providing a flexible web having a leading edge,
horizontally conveying the leading edge of the flexible web from a supply roll to a predetermined distance past a slitting station,
slitting the web at the slitting station to form a trailing edge of a web segment having the leading edge at one end and the trailing edge at the opposite end,
gripping only the leading edge and trailing edge,
conveying the leading edge toward the trailing edge while supporting the web segment with at least one upwardly directed fluid stream to form an upwardly extending bulge in the web upstream from the leading edge,
forming with at least one downwardly directed fluid stream a downwardly hanging U-shaped loop in the web segment between the leading edge and trailing edge as the leading edge is conveyed toward the trailing edge,
terminating the upwardly directed and downwardly directed fluid streams,
inverting the leading edge and the trailing edge of the web segment,
overlapping the leading edge and the trailing edge of the web segment and
permanently securing the leading edge to the trailing edge to form a belt.

5. A process for fabricating a flexible belt comprising
gripping at a web slitting station the leading edge of a web from a supply roll,
conveying the leading edge past the slitting station to a first predetermined location downstream from the slitting station, the web having a first major upwardly facing surface on one side and a second major downwardly facing surface on the opposite side,
gripping only the second major downwardly facing surface of the web at a second predetermined location upstream from the slitting station,
conveying the leading edge back toward the slitting station toward a third predetermined location upstream of the first predetermined location,
gripping only the second major downwardly facing surface of the web at a fourth predetermined location between the slitting station and the first predetermined location,
gripping only the second major downwardly facing surface of the web at a fifth predetermined location between the slitting station and the first predetermined location,
slitting the web at the slitting station to form a web segment having a trailing edge opposite the leading edge,
as the leading edge is conveyed back toward the third predetermined location, applying a first fluid stream in an upward direction against a region of the second major downwardly facing surface immediately downstream of the third predetermined location to form an upwardly extending bulge in the web segment upstream of the leading edge,
as the leading edge is conveyed back toward the third predetermined location, applying a second fluid stream in a downward direction against a region of the first major upwardly facing surface between the third predetermined location and the fourth predetermined location to form a downwardly hanging U-shaped loop in the web segment,
terminating application of the first fluid stream to the second downwardly facing surface,
terminating application of the second fluid stream to the first upwardly facing surface, gripping only the second major downwardly facing surface of the web segment adjacent the leading edge of the web segment at the third predetermined location, inverting the second major downwardly facing surface of the web adjacent the leading edge of the web segment, inverting the second major downwardly facing surface of the web segment adjacent the trailing edge, overlapping the leading edge of the web segment and the trailing edge to form a closed loop of the web segment loosely suspended from a joint formed by the overlapped leading edge and trailing edge, and welding the overlapped leading edge and trailing edge together.

6. A process according to claim 5 wherein the first fluid stream is applied to the region of the second major downwardly facing surface prior to the applying of the second fluid to the region of the first major upwardly facing surface.

7. process according to claim 5 wherein the first fluid stream is applied to the region of the second major downwardly facing surface simultaneously with the applying of the second fluid to the region of the first major upwardly facing surface.

8. A process according to claim 5 wherein the gripping of only the second major downwardly facing surface of the web segment adjacent the leading edge of the web segment at the third predetermined location occurs subsequent to the terminating of the application of the first fluid stream to the second downwardly facing surface.

9. A process according to claim 8 wherein the gripping of only the second major downwardly facing surface of the web segment adjacent the leading edge of the web segment at the third predetermined location occurs prior to the terminating of the application of the second fluid stream to the first upwardly facing surface.

10. A process according to claim 5 wherein the sequence of the overlapping of the leading edge of the web segment and the trailing edge forms a joint in which the leading edge overlies the trailing edge.

11. A process according to claim 5 wherein the sequence of the overlapping of the leading edge of the web segment and the trailing edge forms a loop in which the trailing edge overlies the leading edge.

12. Apparatus for fabricating a flexible belt comprising a slitting station, a conveying gripper to substantially horizontally convey the leading edge of a flexible web under tension from a supply roll downstream past the slitting station, a cutting device at the slitting station to slit the web a predetermined distance from the leading edge to form a web segment having the leading edge at one end and a trailing edge at the opposite end, a first invertible gripper to support the trailing edge, a second invertible gripper adapted to receive the leading edge from the conveying gripper, a first fluid stream implement to direct at least one fluid stream upwardly against the web segment to support the web segment between the leading edge and the second invertible gripper, a second fluid stream implement to direct at least one fluid stream downwardly against the web segment to form a U-shaped loop in the web segment between the second invertible gripper and the first invertible gripper, at least one drive mechanism to invert the first invertible gripper and second invertible gripper to overlap the leading edge and the trailing edge of the web segment to form a joint, and a joining device to permanently join the leading edge and the trailing edge together to form a belt.

13. Apparatus according to claim 12 wherein the conveying gripper, the first invertible gripper, and the second invertible gripper are activatable vacuum shoes.

14. Apparatus according to claim 12 wherein the first fluid stream implement comprises at least one nozzle positioned below the web segment and downstream of the second invertible gripper.

15. Apparatus according to claim 12 wherein the second fluid stream implement comprises at least one nozzle positioned above the web segment and between the second invertible gripper and the first invertible gripper.

* * * * *